(12) United States Patent
Jung et al.

(10) Patent No.: US 9,928,028 B2
(45) Date of Patent: Mar. 27, 2018

(54) MOBILE TERMINAL WITH VOICE RECOGNITION MODE FOR MULTITASKING AND CONTROL METHOD THEREOF

(71) Applicant: LG ELECTRONICS INC., Seoul (KR)

(72) Inventors: Changho Jung, Seoul (KR); Junyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 646 days.

(21) Appl. No.: 14/176,593

(22) Filed: Feb. 10, 2014

(65) Prior Publication Data

US 2014/0237367 A1 Aug. 21, 2014

(30) Foreign Application Priority Data

Feb. 19, 2013 (KR) .................... 10-2013-0017282

(51) Int. Cl.
*G06F 3/00* (2006.01)
*G06F 9/00* (2006.01)
(Continued)

(52) U.S. Cl.
CPC ............ *G06F 3/167* (2013.01); *G06F 3/0481* (2013.01); *G06F 3/0488* (2013.01);
(Continued)

(58) Field of Classification Search
CPC .. G06F 3/04845; G06F 3/0488; G06F 9/4443; G06F 8/34; G06F 3/0486; G06F 8/38; G06F 3/0481; G06F 3/0482; G06F 3/04812; G06F 3/04847; G06Q 10/10; H04N 1/00389; H04N 1/00411

See application file for complete search history.

(56) References Cited

U.S. PATENT DOCUMENTS 6,590,583 B2 * 7/2003 Soohoo ................. G06T 3/0025
345/660
7,619,615 B1 * 11/2009 Donoghue .......... G06F 3/04895
345/169
(Continued)

FOREIGN PATENT DOCUMENTS

CN 1717717 A 1/2006
CN 101557432 A 10/2009
(Continued)

*Primary Examiner* — Kieu Vu
*Assistant Examiner* — Anita D Chaudhuri
(74) *Attorney, Agent, or Firm* — Birch, Stewart, Kolasch & Birch, LLP

(57) ABSTRACT

There is provided a mobile terminal and a method of controlling a mobile terminal. The mobile terminal according to the one embodiment analyzes a voice signal received through the audio input unit, when going to a voice recognition mode, selects at least one application to be executed, and at least one item of content to be used in the application, according to the analyzed voice signal, wherein the at least one item of content is selected from items of content displayed on the touch screen, and executes the selected at least one application by using the selected at least one item of content according to the analyzed voice signal.

11 Claims, 36 Drawing Sheets

(51) Int. Cl.
*G06F 17/00* (2006.01)
*G06F 3/16* (2006.01)
*G06F 3/0481* (2013.01)
*G06F 3/0484* (2013.01)
*G06F 3/0488* (2013.01)
*G10L 15/22* (2006.01)

(52) U.S. Cl.
CPC .. *G06F 3/04845* (2013.01); *G06F 2203/0381* (2013.01); *G10L 2015/223* (2013.01)

(56) References Cited

U.S. PATENT DOCUMENTS

| | | | | |
|---|---|---|---|---|
| 8,117,623 | B1* | 2/2012 | Malasky | G06F 9/543 715/727 |
| 2004/0088170 | A1* | 5/2004 | Nakanishi | G06F 21/10 705/52 |
| 2004/0243415 | A1 | 12/2004 | Commarford et al. | |
| 2005/0028094 | A1* | 2/2005 | Allyn | G06F 3/0481 715/273 |
| 2005/0210396 | A1* | 9/2005 | Galli | G06F 8/00 715/758 |
| 2007/0168490 | A1* | 7/2007 | Kent | G06F 17/30887 709/223 |
| 2009/0253463 | A1* | 10/2009 | Shin | H04M 1/72583 455/563 |
| 2009/0254351 | A1* | 10/2009 | Shin | G06F 3/167 704/275 |
| 2010/0016003 | A1* | 1/2010 | Shapiro | H04L 43/0811 455/466 |
| 2010/0235793 | A1* | 9/2010 | Ording | G06F 1/1626 715/863 |
| 2012/0044164 | A1* | 2/2012 | Kim | G06F 3/04842 345/173 |
| 2013/0033422 | A1 | 2/2013 | Choi et al. | |
| 2013/0322665 | A1* | 12/2013 | Bennett | G08G 1/096855 381/300 |
| 2013/0325481 | A1* | 12/2013 | van Os | G10L 21/00 704/275 |
| 2013/0339159 | A1* | 12/2013 | Shaikh | G06Q 30/0643 705/14.73 |

FOREIGN PATENT DOCUMENTS

EP 2 309 489 A1 4/2011
KR 10-2013-0016025 A 2/2013

* cited by examiner

MOBILE TERMINAL WITH VOICE RECOGNITION MODE FOR MULTITASKING AND CONTROL METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2013-0017282, filed on 19 Feb. 2013, the contents of which are incorporated by reference herein in their entirety.

TECHNICAL FIELD

The present invention relates to a mobile terminal that provides a result of execution according to a voice signal that is input, by analyzing a voice recognition application, and a method of control the mobile terminal.

DISCUSSION OF THE RELATED ART

Considerable advancements in hardware technologies relating to a variety of electronic devices including mobile terminals and in software technologies have enabled the electronic devices to provide or store a wide variety of functions and items of information. Accordingly, this has enabled a screen provided in the electronic device to provide the wide variety of items of information.

Also in a case of the mobile terminal equipped with a touch screen, only a touch operation by a user provides access to the variety of items of information displayed on the touch screen.

The recent electronic devices, capable of performing multitasking, perform a specific function according to a text-based voice command and provide a result of the performance.

Accordingly, a user interface needs to be developed, in which content, currently being edited on a display screen, is conveniently selected for direct use in a voice command.

SUMMARY

The present invention relates to a mobile terminal that selects an application to be executed in a voice recognition mode, executes the selected application by using data on content displayed, and provides a result of the execution, and a method of controlling the mobile terminal.

According to an aspect of the present invention, there is provided a mobile terminal including a touch screen, an audio input unit, and a controller configured to analyze a voice signal received through the audio input unit, when going to a voice recognition mode, select at least one application to be executed, and at least one item of content to be used in the application, according to the analyzed voice signal, wherein the at least one item of content is selected from items of content displayed on the touch screen, and execute the selected at least one application by using the selected at least one item of content according to the analyzed voice signal.

In the mobile terminal, wherein the controller is further configured to display a control window on which to control the voice recognition mode, when going to the voice recognition mode, convert the control window to a form of a movable floating window, when receiving a specific input, and display the converted floating window which overlaps with at least one area of the at least one item of content.

In the mobile terminal, wherein the step of selecting the at least one item of content to be used in the application, comprises moving the converted floating window to the at least one area of the at least one item of content.

In the mobile terminal, wherein the step of selecting the at least one item of content to be used in the application, comprises moving the converted floating window to the at least one area of the at least one item of content.

In the mobile terminal, wherein the controller is further configured to move the flowing window along a trajectory of a drag input, when receiving the drag input with respect to the floating window, display at least one item of content, at least one area of which overlaps with the moved floating window, in a manner that gives a visual distinction, and determine the overlapped at least one item of content as the selected at least one item of content, when the drag input is released.

In the mobile terminal, wherein the controller is further configured to reduce or enlarge a size of the floating window, when receiving a specific input with the floating window, display at least one item of content that overlaps with the floating window the size of which is changed, in a manner that gives a visual distinction, and determine the overlapped at least one item of content that overlaps, as the selected least one item of content.

In the mobile terminal, wherein the controller is further configured to display displays a soft key indicating the floating window on the border area, when receiving an dragging input of the floating window to a border area of the touch screen.

In the mobile terminal, if at least one item of content is a photograph, the controller uses a thumbnail file of the photograph, as the selected at least one item of content, and if at least item of content is displayed within a screen of a Web browser, the controller uses a URL address of the screen of the Web browser, or a link address to the screen of the Web browser as the selected at least one item of content.

In the mobile terminal, wherein controller is further configured to display an execution screen of the application, in a form of a pop-up window, or one area of the screen of the touch screen, or an entire area of the touch screen.

In the mobile terminal, wherein controller is further configured to go back to the voice recognition mode, when execution of the application is completed or the execution is canceled.

In the mobile terminal, wherein the controller is further configured to display the control window on an upper or lower area of the execution screen of a specific application, when going to the voice recognition mode by touching on a shortcut icon displayed on a status bar that is slid from an upper portion of the touch screen in the execution screen of the specific application.

In the mobile terminal, wherein the controller is further configured to divide the touch screen into two areas, a first area and a second area, when going to the voice recognition mode, and display the at least one item of content on the first area of the touch screen, and the control window on the second area of the touch screen.

According to another aspect of the present invention, there is provided a mobile terminal comprising a touch screen, an audio input unit, and a controller configured to display a control window on which to control the voice recognition mode, in a form of a movable floating window at least one area of which overlaps with at least one item of content that is displayed on the touch screen, when going to a voice recognition mode, select at least one application to be executed, by analyzing a voice signal received through the audio input unit, and at least one item of content to be used in the application, by using the floating window and the analyzed audio signal, and execute the application by using the selected at least one item of content according to the analyzed voice signal.

According to still another aspect of the present invention, there is provided a method of controlling a mobile terminal, comprising receiving a voice signal in a state where items of content is displayed, analyzing the received voice signal, selecting at least one application to be executed, and at least one item of content to be used in the application, according to the analyzed voice signal, wherein the at least one item of content is selected from the displayed items of content displayed, and executing the selected at least one application by using the selected at least one item of content according to the analyzed voice signal.

In the method of controlling a mobile terminal, wherein the step of selecting the at least one of content comprises converting the control window to a form of a floating window, moving the floating window to at least one area of which overlaps with the at least one item of content displayed, and determining the overlapped at least one item of content as the selected at least one of content.

Effects of the mobile terminal and the method of controlling the mobile terminal according to the present invention are as follows. According to one embodiment of the present invention, when the switching to the voice recognition mode is also performed while executing the specific application, and the specific application is executed according to the voice signal that is input, the content included in the screen that is displayed when executing the specific application can be directly used.

According to one embodiment of the present invention, the voice recognition mode can be used as well without limiting the execution screen of the specific application, by converting the control window showing the voice recognition mode, to the form of the transparent floating window and displaying the converted control window.

According to one embodiment of the present invention, the content to be used in the voice recognition mode can be easily selected and the selected content can be checked by the user, visually in real time.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
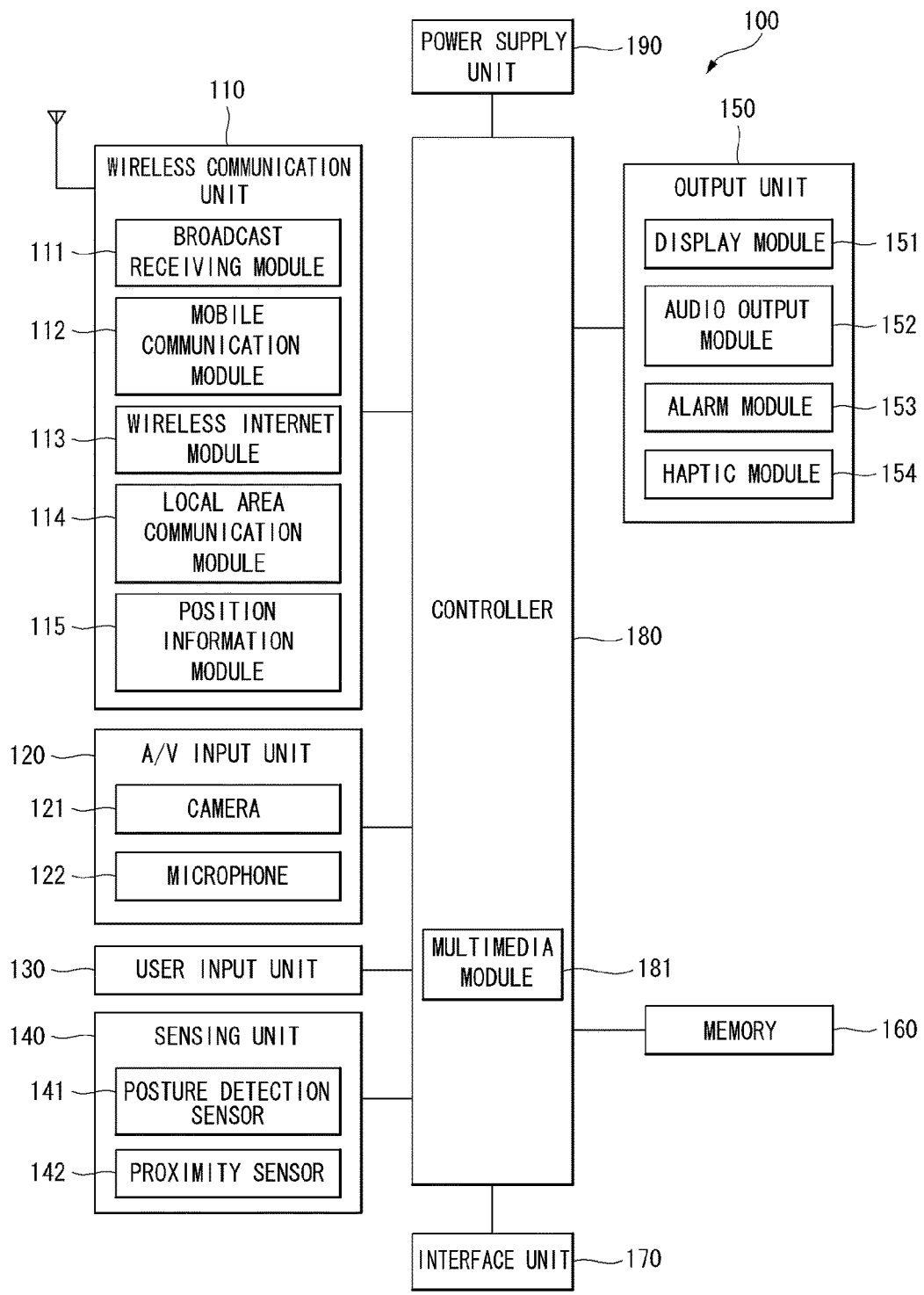
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor (of the sensing unit 140) may be located in an internal area of the mobile terminal 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Embodiments disclosed in the present specification may be realized in the mobile terminal 100 described referring to FIG. 1.

A display module 151, which is assumed to be a touch screen 151, is described in the present specification. As described above, the touch screen 151 may perform both a function of displaying information and a function of inputting information. However, it is apparently emphasized that the prevent invention is not limited thereto.

In addition, a touch gesture in the present specification refers to a gesture that is made by performing a contact touch or a proximity touch on the touch screen 151, and a touch input refers to input that is received through the use of the touch gesture.

The touch gesture is categorized by a motion type into tapping, drag, flicking, press, multi-touch, pinch-in, pinch-out, and the like.

The tapping is motion that is made by lightly pushing on the touch screen 151 one time, and refers to the touch gesture such as the click of a mouse as an input device of a general-purpose computer.

In addition, the drag is motion that is made by touching a specific area on the touch screen 151 and in this state pulling it along the touch screen 151. When an object is dragged, the object may be displayed while being continuously moved in a dragging direction.

In addition, the flicking is motion that is made by touching a specific area on the touch screen 151 and then moving it with a sudden quick movement in a specific direction (upward, downward, to the left, to the right, or diagonally). The mobile terminal 100, when receiving touch input resulting from the flicking, performs processing on a specific motion, based on a flicking direction, a flicking speed, and the like. For example, page-turning motion may be performed on an e-book, based on the flicking direction.

In addition, the press is motion that is made by touching a specific area on the touch screen 151 and then continuously maintaining the touch for a predetermined time or more.

In addition, the multi-touch is motion that is made by touching on multiple points on the touch screen 151 at the same time.

In addition, the pinch-in is motion that is made by dragging multi-touched areas on the touch screen 151 in the direction of decreasing a distance between them. That is, the pinch-in is the motion that is made by dragging at least one area of the multi-touched areas on the touch screen 151 toward the other area in the direction of decreasing the distance between them.

In addition, the pinch-out is motion that is made by dragging the multi-touched areas on the touch screen 151 in the direction of increasing a distance between them. That is, the pinch-out is the motion that is made by dragging at least one area of the multi-touched areas on the touch screen 151 toward the other area in the direction of increasing the distance between them.

Figure 2:
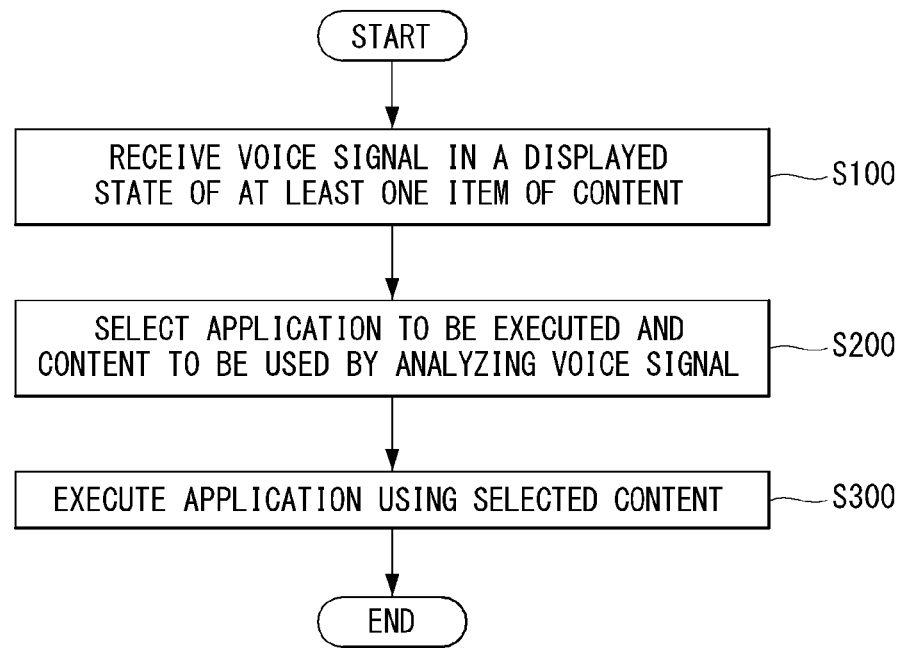
FIG. 2 is a flowchart illustrating a method of controlling a mobile terminal according to the present invention.

FIG. 2 is a flowchart illustrating a method of controlling a mobile terminal according to the present invention.

Referring to FIG. 2, a controller (180 in FIG. 1) of a mobile terminal (100 in FIG. 1) according to the present invention receives a voice signal in a state where at least one item of content is displayed (S100), analyzes a voice signal received through the audio input unit, when going to a voice recognition mode and selects an application to be executed and at least one item of content to be used, by analyzing the received voice signal (S200), and executes the application by using the selected at least one item of content (S300). The present invention uses item and content as a same meaning.

The present invention has a feature that content included in a currently-displayed screen or information on the content is selected as specific content, and the specific content selected from the currently-displayed screen in a voice recognition mode is used.

Specifically, the controller (180 in FIG. 1) receives the voice signal in a state where an execution screen on which to display a specific application is displayed, and analyses the voice signal, and selects content for the analyzed voice signal to use by using at least one item of content that is currently displayed. The controller (180 in FIG. 1) selects the application to be executed, by using the selected content, according to the analyzed voice signal.

For example, in a case where the voice signal is input that represents that a currently-displayed photograph has to be transmitted to a specific person on whom information is recorded in an address book, the controller (180 in FIG. 1) analyzes the voice signal, and thus selects a message application as the application to be executed and selects a file of the currently-displayed photograph as the content to be used.

The controller (180 in FIG. 1) executes the message application, and thus transmits a file of the selected photograph to the specific person on whom the information is recorded in the address book.

In a case where the execution of the selected application is completed or canceled, the controller (180 in FIG. 1) performs switching back to the voice recognition mode.

In other words, the controller (180 in FIG. 1) executes a second application by using the content currently displayed on a touch screen, in the voice recognition mode, with an execution screen of a first application being displayed on the touch screen, and thus executes a voice command.

When the execution of the voice command is completed, the controller (180 in FIG. 1) displays back the screen that shows a control window on which the execution screen of the first application, or the execution screen of the first application and the voice recognition mode appear.

At this point, the process of going to the voice recognition mode may be a process of the first application being in progress, or a process prior to the execution of the first application.

Embodiments according to the present invention are specifically described below.

Figure 3:
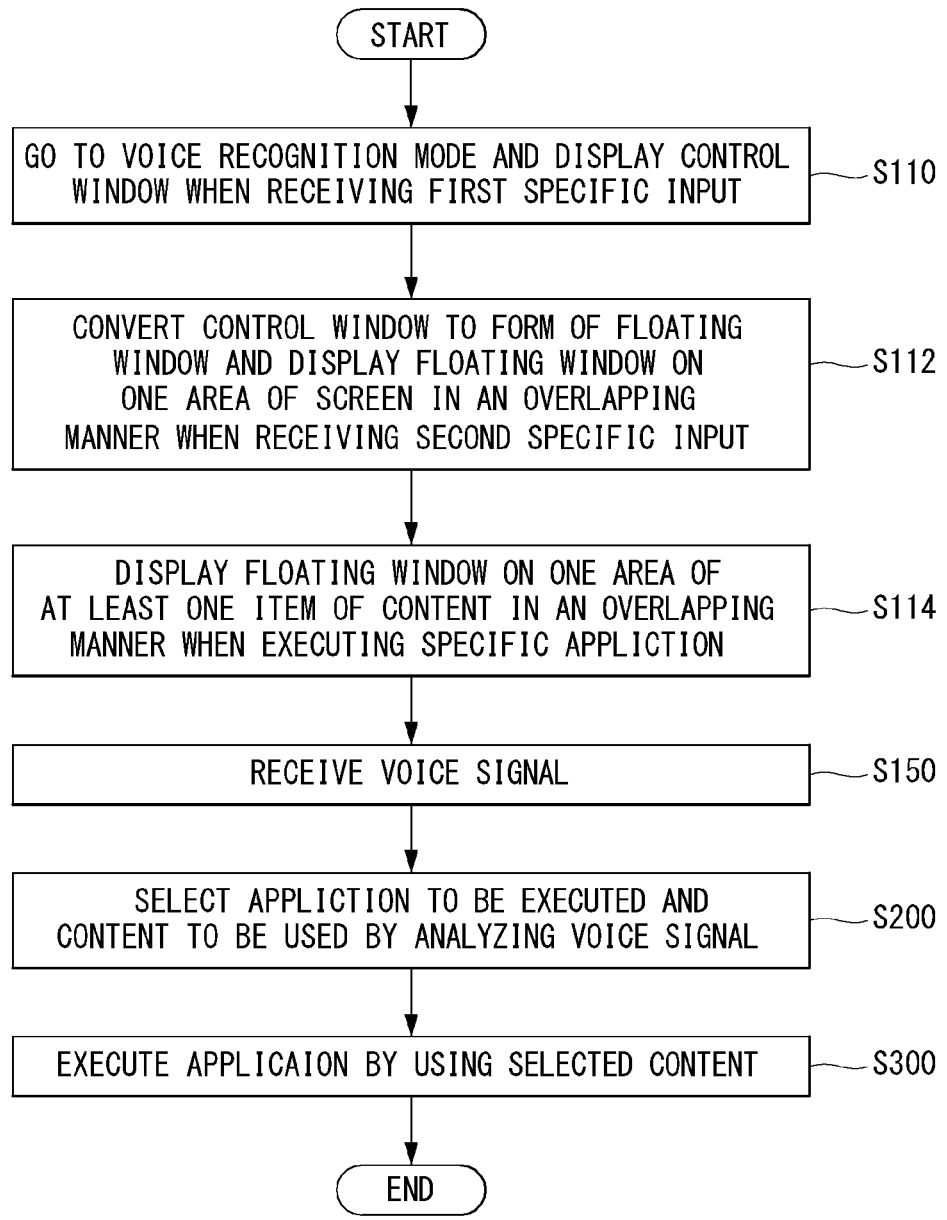
FIG. 3 is a flowchart illustrating a method of controlling a mobile terminal according to a first embodiment of the present invention.

FIG. 3 is a flowchart illustrating a method of controlling a mobile terminal according to a first embodiment of the present invention. FIGS. 4A to 8C are diagrams, each for describing the method of controlling the mobile terminal according to the first embodiment of the present invention.

Referring to FIG. 3, the method of controlling the mobile terminal according to the first embodiment of the present invention is an embodiment in which the specific application is executed after going to the voice recognition mode, and another application is executed by using the content included in the execution screen of the specific application.

According to the first embodiment, when receiving a first specific input, the controller (180 in FIG. 1) goes to the voice recognition mode, and displays the control window on the screen (S110).

The voice recognition mode is a mode in which the voice signal received from a microphone (122 in FIG. 1) is analyzed, and a result of the execution is provided by performing a specific function according to the meaning of the analyzed voice signal. The voice recognition mode is also a mode in which a text-based voice recognition application is executed. The control window is a fixed window or a screen on which to control the voice recognition mode.

Specifically, when receiving the first specific input, the controller (180 in FIG. 1) goes to the voice recognition mode, and activates the microphone (122 in FIG. 1) to receive the voice signal through the microphone.

At this point, the first specific input is a touch input by which to select a voice recognition application icon on a home screen, or the touch input by which to select a shortcut icon on a status bar.

When executing the voice recognition application, the controller (180 in FIG. 1) displays the control window on which to control the voice recognition mode on an entire area of the screen of the touch screen or one area of the touch screen.

In a case where the control window is displayed on the entire area of the screen of the touch screen, the control window is the execution screen of the voice recognition application or the screen that shows a result of the execution.

In a case where the control window is displayed on one area the touch screen, the control unit (180 in FIG. 1) displays the control window on a high-order layer of one area of the touch screen, or divides the touch screen area into a first area and a second area to display the home screen on the first area and display the control window on the second screen.

Next, when receiving a second specific input, the controller (180 in FIG. 1) converts the control window to a form of a floating window and displays the floating window on one area of the touch screen in an overlapping manner (S112).

At this point, the second specific input may be a touch input with respect to a soft key displayed on the control window, a touch input with respect to a function key on the mobile terminal (100 in FIG. 1), or an operational input with respect to an operational key installed on a lateral surface of the mobile terminal (100 in FIG. 1).

When receiving the second specific input, the controller (180 in FIG. 1) converts the control window to the form of the floating window that is movable and transparent, and displays the first specific input on one area of the touch screen that is present prior to the receiving of the first specific input, in an overlapping manner.

For example, in a case where the screen present prior to the receiving of the first specific input is the home screen, the controller (180 in FIG. 1) displays the floating window on one area of the home screen in an overlapping manner.

Because the floating window is formed as a transparent or translucent widow, a user visually distinguishes at least one icon, and a widget, which are displayed on one area of the home screen, or the content including a background screen.

Therefore, the controller (180 in FIG. 1) executes the specific application by touching on the icon or the widget displayed on the home screen, in a state where the floating window is displayed.

When the floating window is moved, the controller (180 in FIG. 1) executes the specific application by touching on the icon or the widget displayed on the lower part of the floating window on the home screen.

When the specific application is executed, the controller (180 in FIG. 1) displays the floating window on one area of at least one item of content included in the execution screen on which to execute the specific application, in an overlapping manner (S114).

In a case where the specific application is executed by touching on the icon or the widget displayed on the home screen, the controller (180 in FIG. 1) displays the execution screen of the specific application and displays the floating window on one area of the execution screen of the specific application, in an overlapping manner.

Therefore, the execution screen of the specific application is visible to a user, through the transparent or translucent floating window.

The controller (180 in FIG. 1) receives the voice signal through the activated microphone (122 in FIG. 1) (S150). At this point, the voice signal represents the voice command in which another application stored in the mobile terminal (100 in FIG. 1) is executed by using the entire content or one part of the multiple items of content that are currently displayed on the touch screen, in order to perform the specific function.

The controller (180 in FIG. 1) converts the voice signal received through the microphone (122 in FIG. 1) to a text, selects the application to be executed and the content to be used by analyzing the meaning of the text-converted voice signal (S200), and executes the application by using the selected content.

For example, when the voice signal means that "Upload this screen onto Cyworld," the controller (180 in FIG. 1) captures the execution screen of the currently-displayed specific application, executes a Cyworld application stored in the mobile terminal (100 in FIG. 1), and uploads a file of the captured photograph.

That is, the controller (180 in FIG. 1) selects the specific content to be used, from the currently-displayed screen, by analyzing the meaning of the received voice signal, and executes the application, by using the information on the specific content. In the example described above, the specific content may be a file of a photograph that is currently displayed on the touch screen.

In a case where the selected specific content is the photograph or the captured screen, a thumbnail file of the photograph, or the captured screen is used as information on the specific content. In a case where the selected specific content is a news matter found using a Web browser, a URL address of a screen of the news matter or a link address to the screen of the news matter is used as the information on the specific content. The information on the specific content includes an audio file, a video file, a photograph file, a URL address, a telephone number, an email address and the like, depending on a type of the selected content, or on the application to be used.

The controller (180 in FIG. 1) performs functions of transmitting, sharing and uploading data, by using the information on the selected specific content.

Figure 4A:
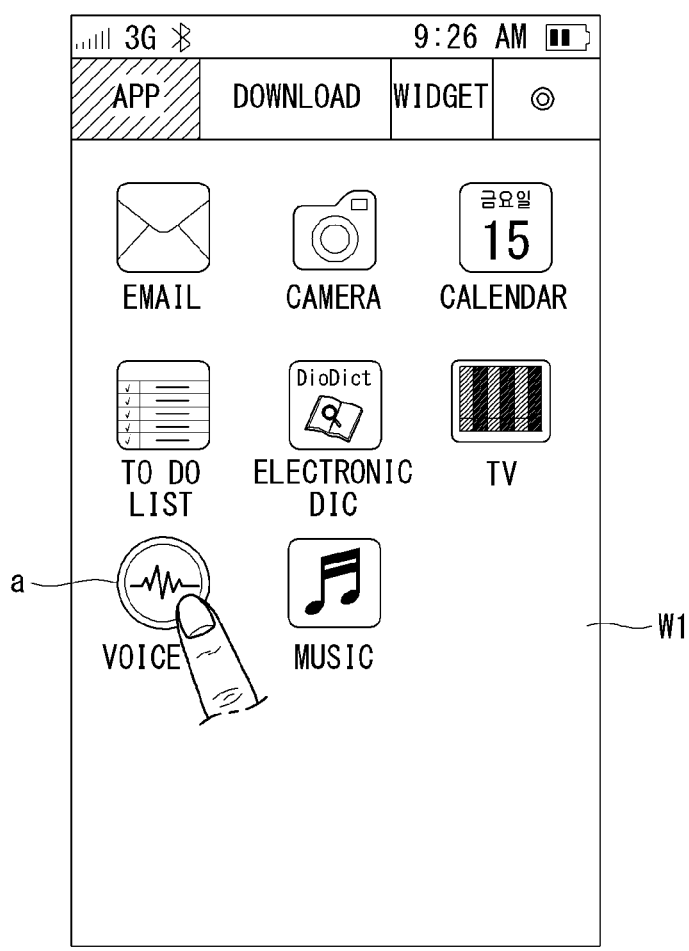
FIGS. 4A to 8C are diagrams, each for describing the method of controlling the mobile terminal according to the first embodiment of the present invention.
Figure 4B:
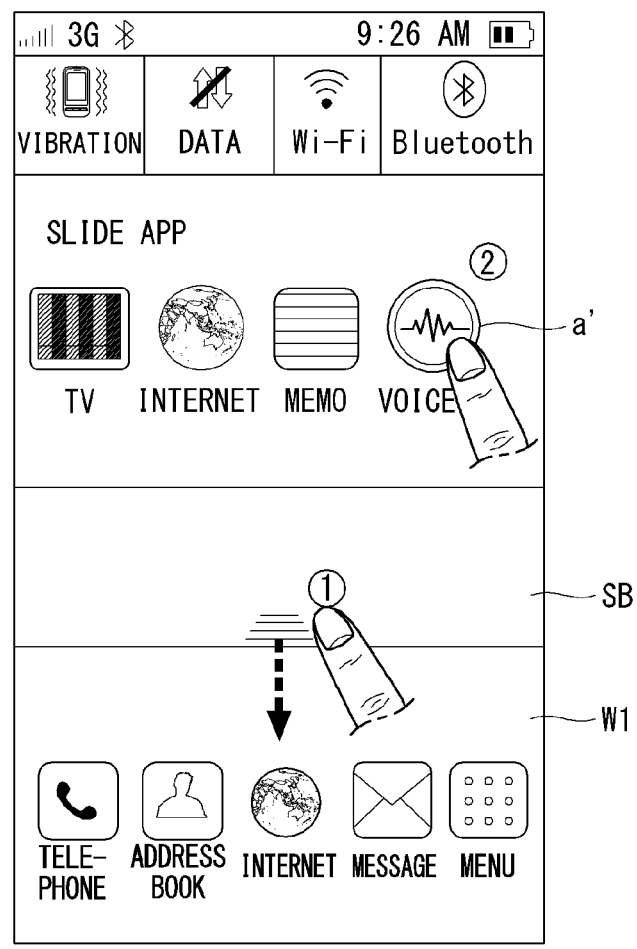

Referring to FIGS. 4A and 4B, when receiving the specific input, the controller (180 in FIG. 1) goes to the voice recognition mode.

Specifically, when receiving the touch input with respect to an icon a of the voice recognition application from a home screen W1, the controller (180 in FIG. 1) executes the voice recognition application to go to the voice recognition mode.

In addition, when a status bar SB is slid to the lower portion of the touch screen (①) and then the touch input with respect to a shortcut icon a' to the voice recognition application is received among slide applications on the status bar SB (②), the controller (180 in FIG. 1) executes the voice recognition application to go to the voice recognition mode.

Figure 5A:
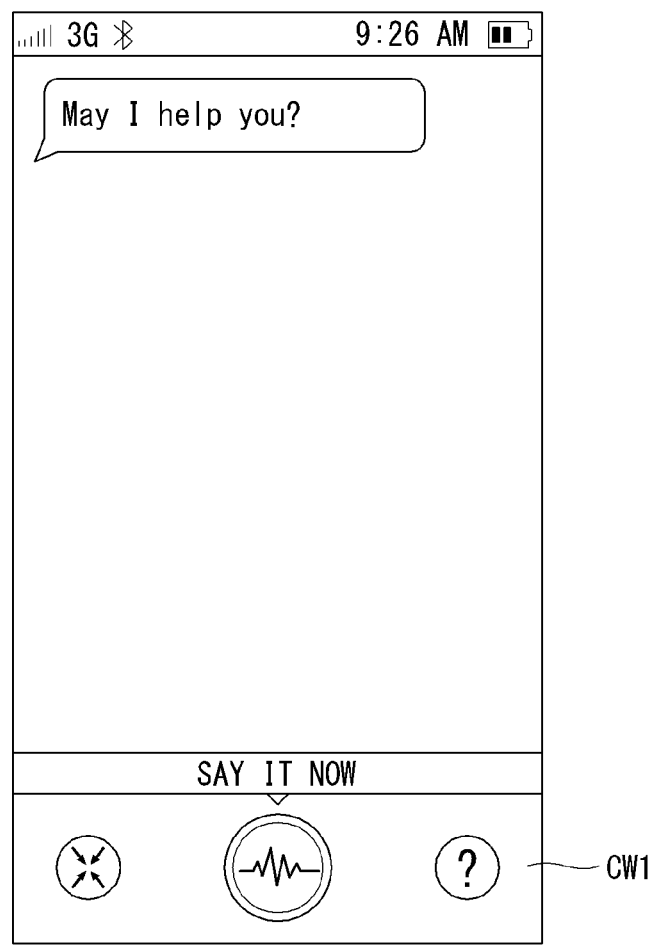
Figure 5B:
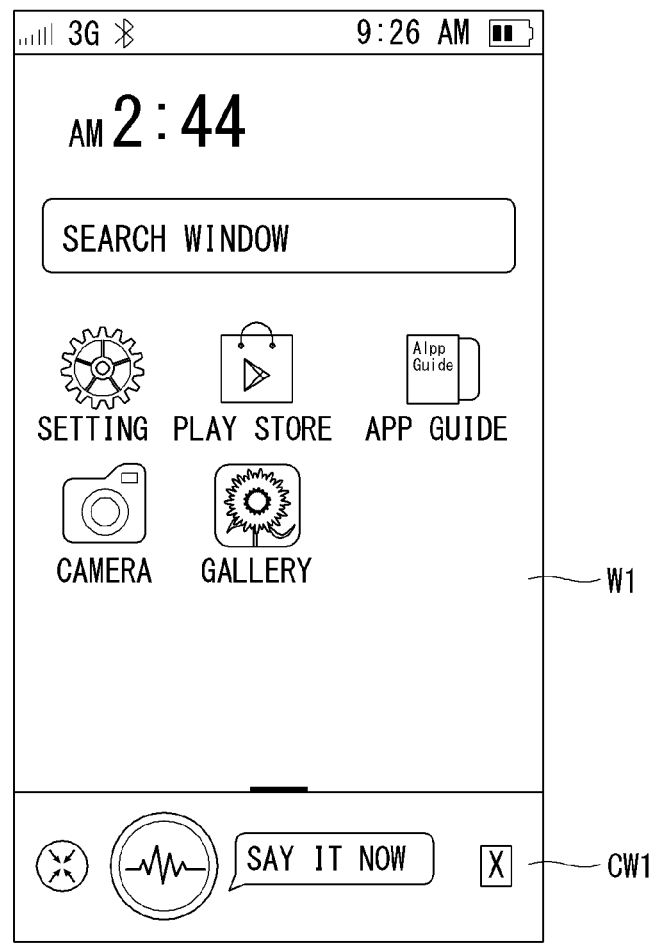
Figure 5C:
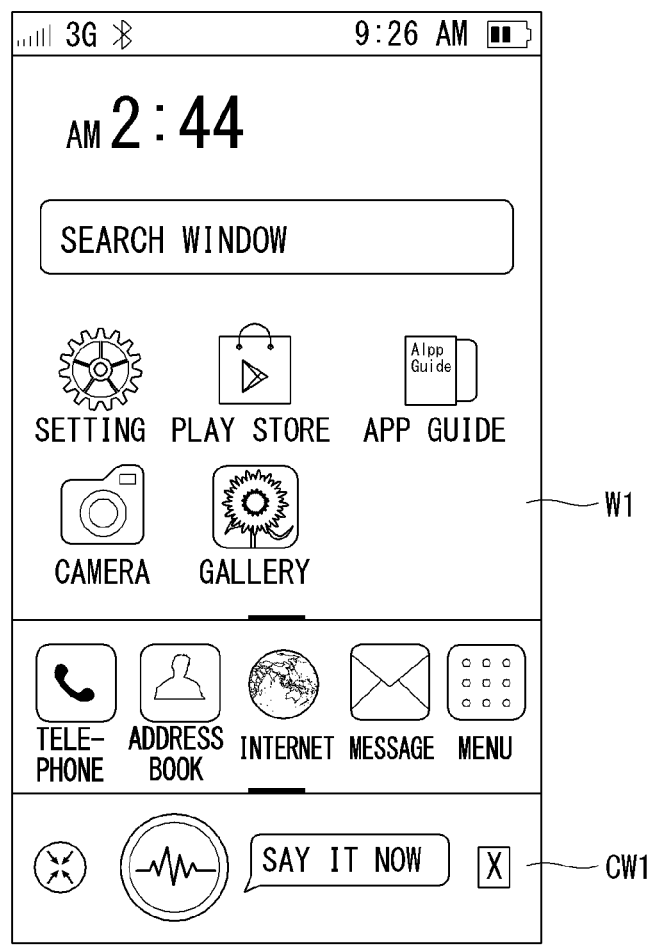

Referring to FIGS. 5A to 5C, the controller (180 in FIG. 1) displays a control window CW1 on which to control the voice recognition mode.

Specifically, the controller (180 in FIG. 1) displays the control window CW1 on the entire screen of the touch screen, displays the control window CW1 on the lower area of the home screen W1 in an overlapping manner, or display the control window CW1 on one area of the touch screen after dividing the touch screen.

The control window CW1 that is displayed on the lower area of the home screen W1 in an overlapping manner is a window in the form of a fixed non-transparent pop-up window and a area of the home screen W1 that overlaps with the control window CW1 is invisible to the user.

In a case where the control window CW1 is displayed on one divided area of the touch screen, the home screen W1 is displayed on a first screen area and the control window CW1 is displayed on a second window. At this point, the touch screen is divided into the first screen area and the second screen area, at a ratio of 1:1 or at a different ratio.

Referring to FIGS. 6A to 6E, when receiving the specific input with respect to the control window CW1, the controller (180 in FIG. 1) converts the control window CW1 to a floating window FW to display it.

Figure 6A:
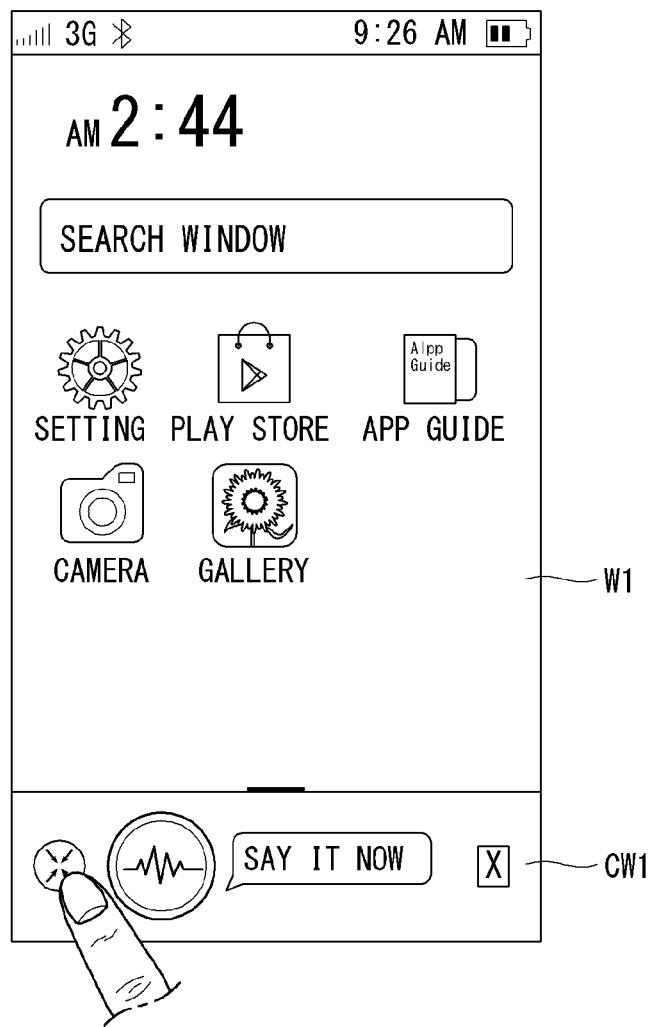
Figure 6B:
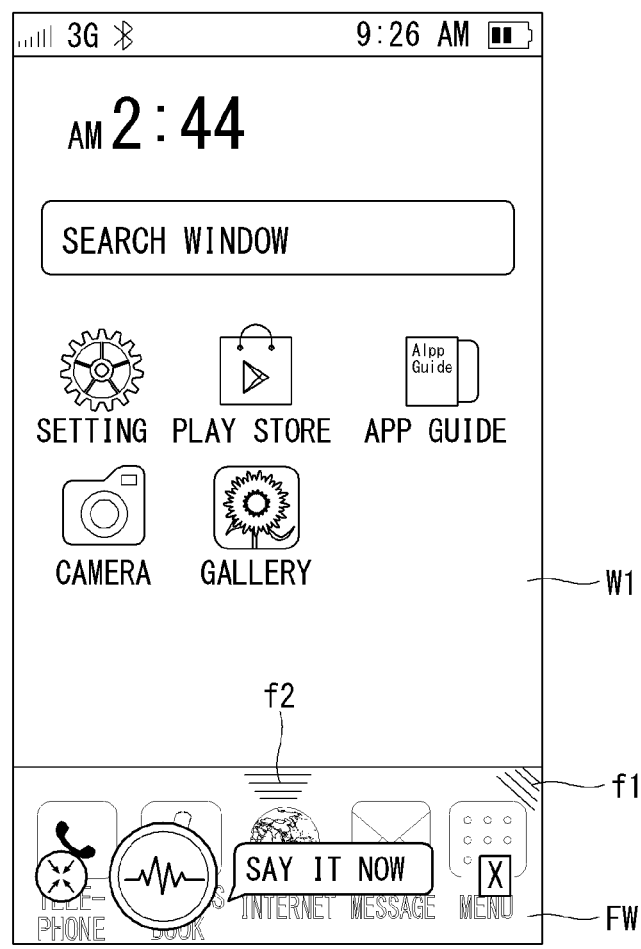
Figure 6C:
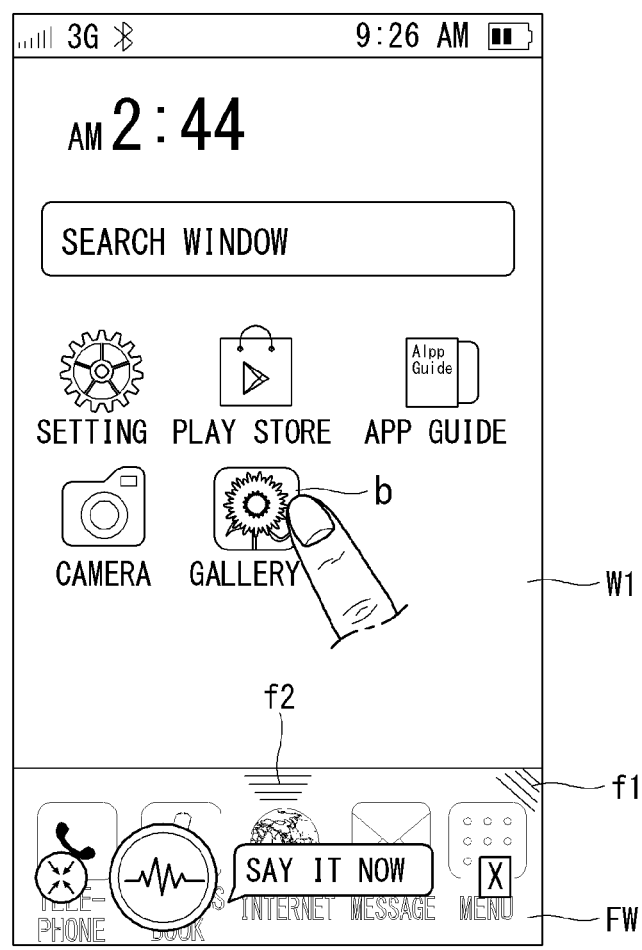

At this point, the specific input may be the touch input (FIG. 6A) with respect to the soft key displayed on the control window CW1. When receiving the specific input, the controller (180 in FIG. 1) converts the control window CW1 to the form of the floating window FW that is movable and transparent, in order to display it (FIG. 6B).

The floating window FW is formed as a transparent or translucent layer in such a manner that the icon or the widget that is displayed on the home screen W1 on an overlapping low-order layer is visible.

When the specific application (for example, a gallery application) is executed, the controller (180 in FIG. 1) displays an execution screen W2 of the specific application on the touch screen, and displays the floating window FW on one area of the execution screen W2 of the specific application in an overlapping manner.

In this case, the execution screen W2 of the specific application is visible to the user through the transparent floating window FW.

A first indicator f1 that is able to adjust the size, is displayed on a corner of the floating window FW, and a second indicator 12 that is able to hide the floating window FW from the touch screen is displayed on a specific area of the floating window FW.

Figure 6D:
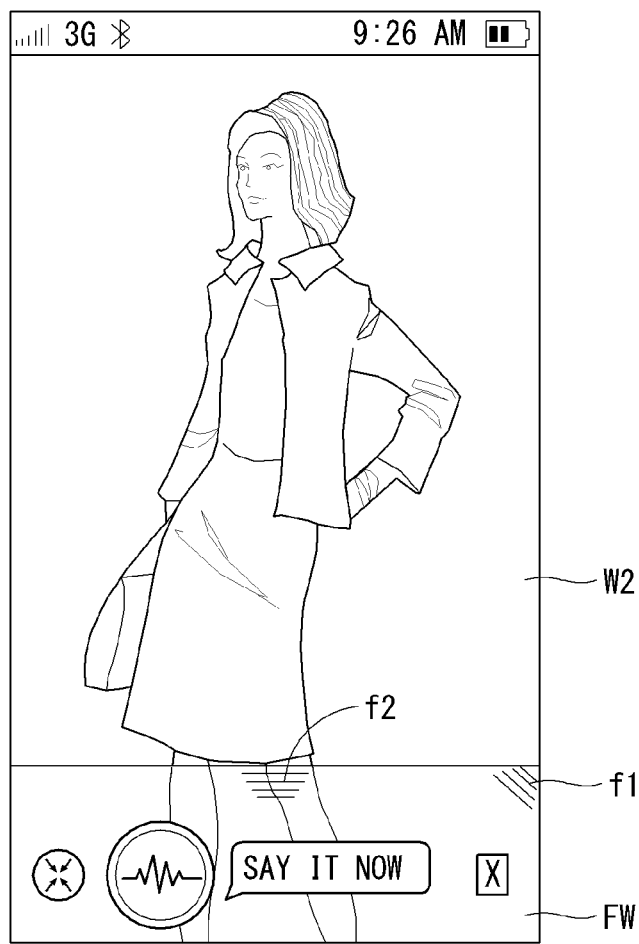
Figure 6E:
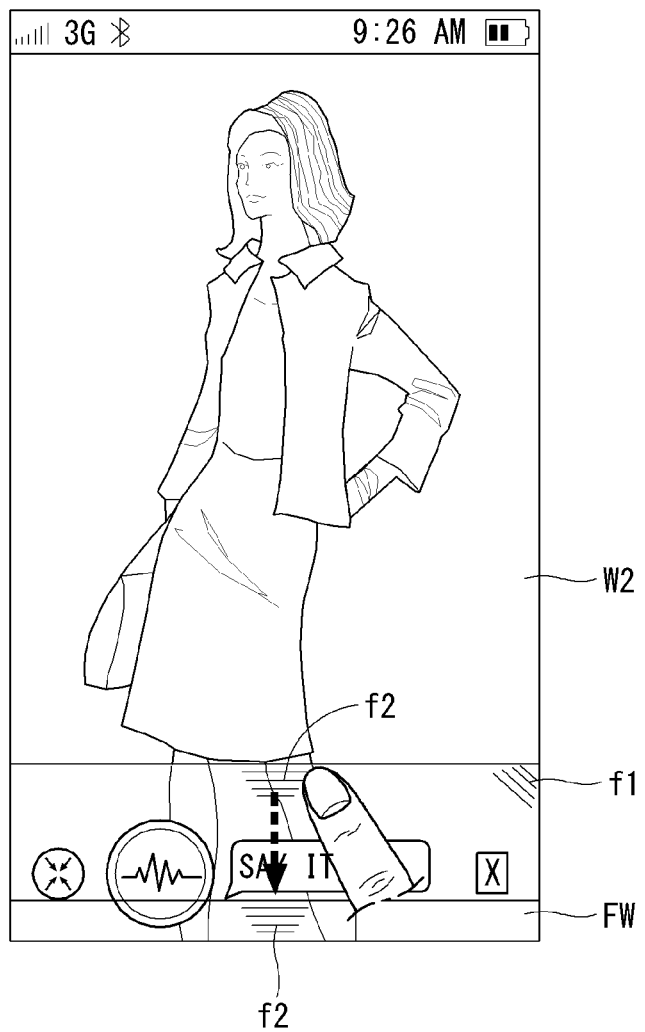

The controller (180 in FIG. 1) hides the floating window FW by dragging the second indicator 12 to the edge end of the touch screen and displays only the second indicator f2 on the edge area of the touch screen (FIG. 6E).

Therefore, while executing the specific application, the controller (180 in FIG. 1) may continue to display the floating window FW on the touch screen, without the floating window FW burying the execution screen of the specific application.

Figure 7A:
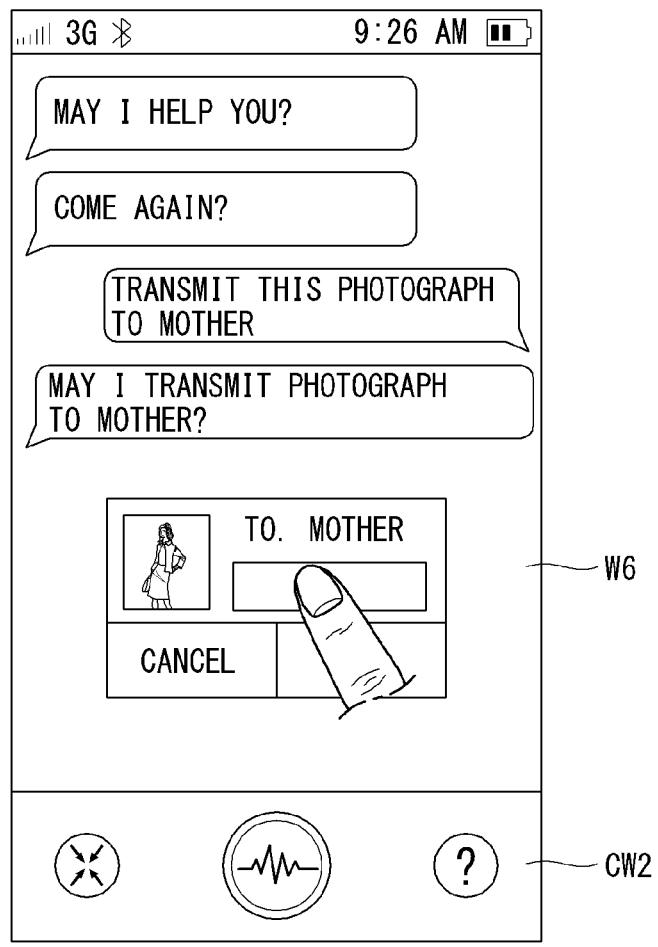
Figure 7B:
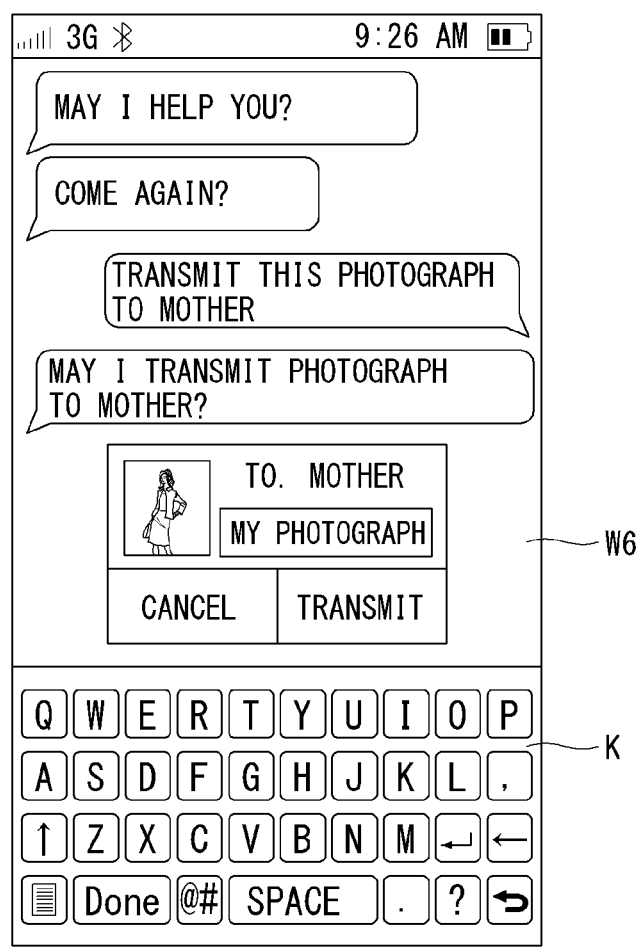
Figure 7C:
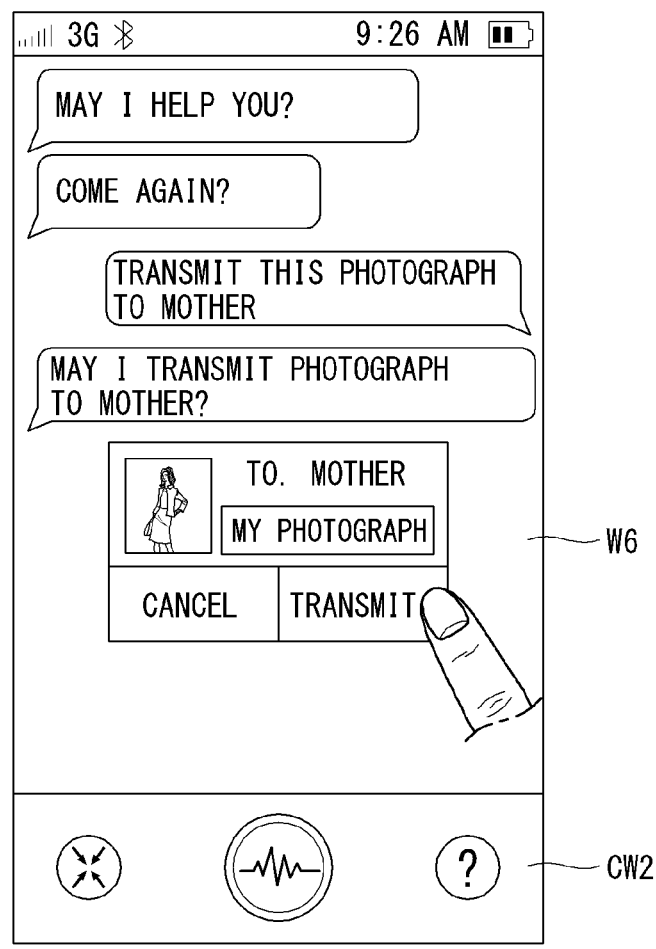
Figure 7D:
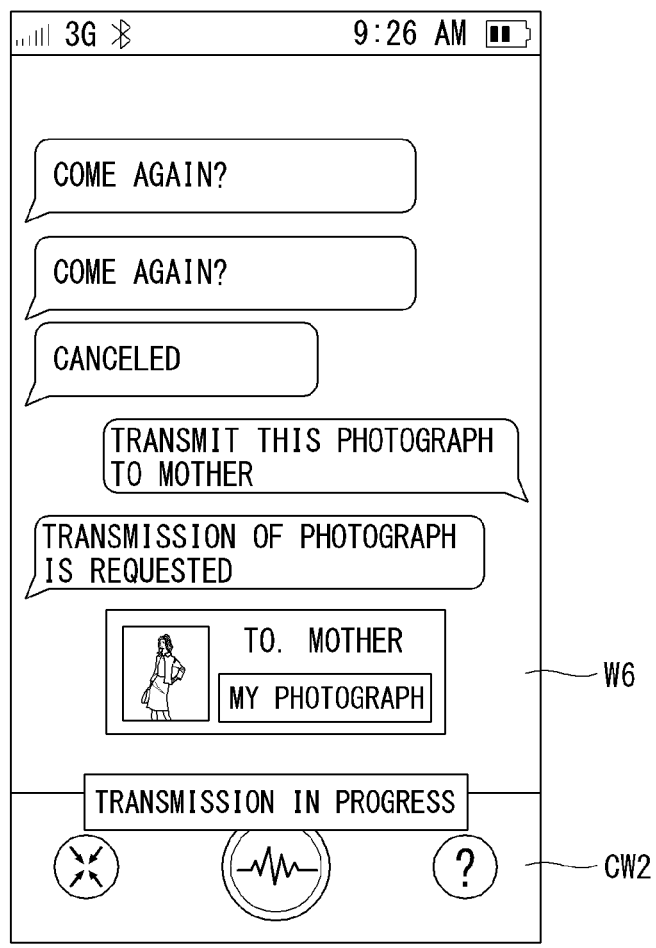

Referring to FIGS. 7A and 7D, by analyzing the received voice signal, the controller (180 in FIG. 1) selects the displayed photograph, as the content to be used, and selects the message application, as the application to be executed. Thus, the controller (180 in FIG. 1) executes the application by using the selected content.

For example, in a case where the voice signal is input through the microphone (122 in FIG. 1), meaning that "Transmit this photograph to mother," the controller (180 in FIG. 1) converts the voice signal to the text and selects the content and the application that are to be used, according to the meaning of the text.

From the meaning of the voice signal, the controller (180 in FIG. 1) selects the content that corresponds to "this photograph," as the content to be used, and selects the application that corresponds to "Transmit," as the application to be used.

The controller (180 in FIG. 1) may select the content that corresponds to "this photograph," as the thumbnail file of the photograph that is included in the currently-displayed screen, and may select the application, as the message application.

Therefore, the controller (180 in FIG. 1) executes the message application, searches the address book for the information corresponding to "mother" from the meaning of the voice signal, and transmits a thumbnail file of the photograph included in the currently-displayed screen to the telephone number that corresponds to "mother."

The controller (180 in FIG. 1) displays the execution screen (W6 in FIG. 7A) of the message application, along with the control window CW2, and when an additional-message input window is input-touched from the execution screen (W6 in FIG. 7A) of the message application (FIG. 7A), it displays a keypad K (FIG. 7B). When completing the input of the message (for example "my photograph") through the keypad K (FIG. 7C), the controller (180 in FIG. 1) displays the execution screen (W6 in FIG. 7C) from which to select transmission or cancellation of the message, and when the transmission is selected, it displays a result of the transmission (W6 in FIG. 7D), along with the control window CW2 (FIG. 7D).

The controller (180 in FIG. 1) displays the execution screen (W6 in FIGS. 7A to 7D) of the application selected according to the voice signal, using the entire screen of the touch screen, but may display the execution screen of the selected application as well without switching the screen, by displaying the execution screen of the selected application on the upper portion of the floating window FW displayed on the execution screen of the specific application in FIG. 6D, in the form of a pop-up window.

Figure 8A:
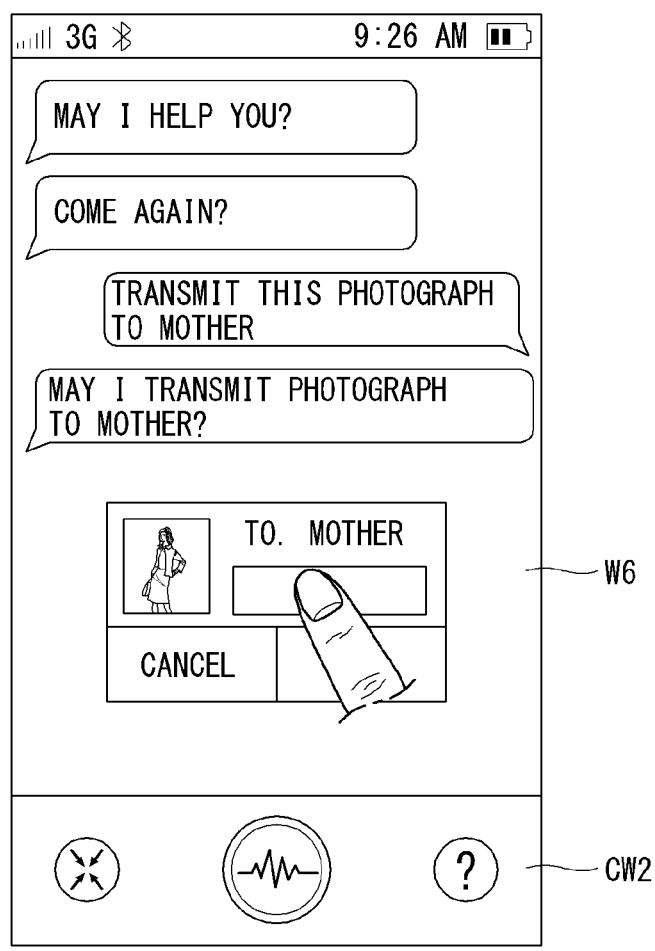
Figure 8B:
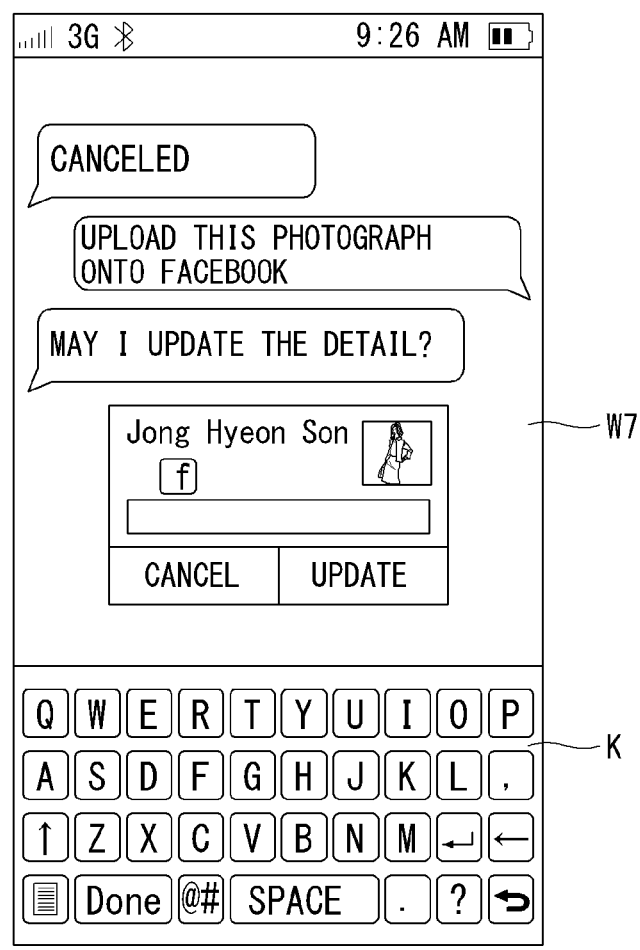
Figure 8C:
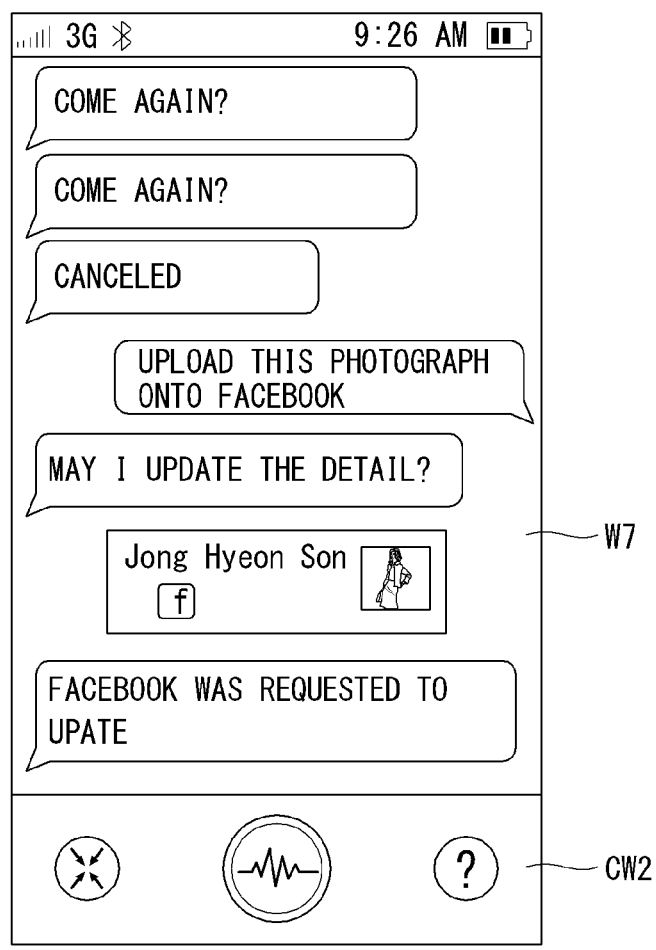

Referring to FIGS. 8A and 8C, the controller (180 in FIG. 1) selects the displayed photograph, as the content to be used, by analyzing the received voice signal, and selects a Facebook application, as the application to be executed, and thus executes the application by using the selected content.

For example, in a case where the voice signal is input through the microphone (122 in FIG. 1), meaning that "Upload this photograph to the Facebook," the controller (180 in FIG. 1) selects the content that corresponds to "this photograph" from the meaning of the voice signal, as the content to be used, and selects the application that corresponds to "Upload to the Facebook," as the application to be used.

The embodiment described above is for specifically describing the present invention, and various modifications thereto are possible, such as a case where content displayed on the touch screen is specified and an application stored in the mobile terminal is executed by using the specified content.

The controller (180 in FIG. 1) may select the content that corresponds to "this photograph," as the thumbnail file of the photograph that is included in the currently-displayed screen, and may select the application, as the message application.

The controller (180 in FIG. 1) displays the execution screen (W7 in FIG. 8A) of the Facebook application, along with the control window CW2, and when the additional-message input window is input-touched from the execution screen (W7 in FIG. 8A) of the message application (FIG. 8A), the controller (180 in FIG. 1) displays the keypad K (FIG. 8B). When the message input is canceled through the keypad K, the controller (180 in FIG. 1) displays the execution screen (W7 in FIG. 8B) from which to select update or cancellation. When the update is selected, the controller (180 in FIG. 1) displays a result of the transmission (W7 in FIG. 8D), along with the control window CW2 (FIG. 8D).

The controller (180 in FIG. 1) displays the execution screen (W7 in FIGS. 8A to 8C) of the application selected according to the voice signal, using the entire screen of the touch screen, but may display the execution screen of the selected application as well without switching the screen, by displaying the execution screen of the selected application on the upper portion of the floating window FW displayed on the execution screen of the specific application in FIG. 6D, in the form of a pop-up window.

At this point, the embodiment in which the currently-displayed photograph is transmitted as the message, and the embodiment in which the currently-displayed photograph is uploaded (updating) onto the Facebook are described specifically above, but the voice command may be executed by selecting the other currently-displayed items of content than the currently-displayed photograph according to the voice signal analysis and executing another application stored in the mobile terminal.

Figure 9:
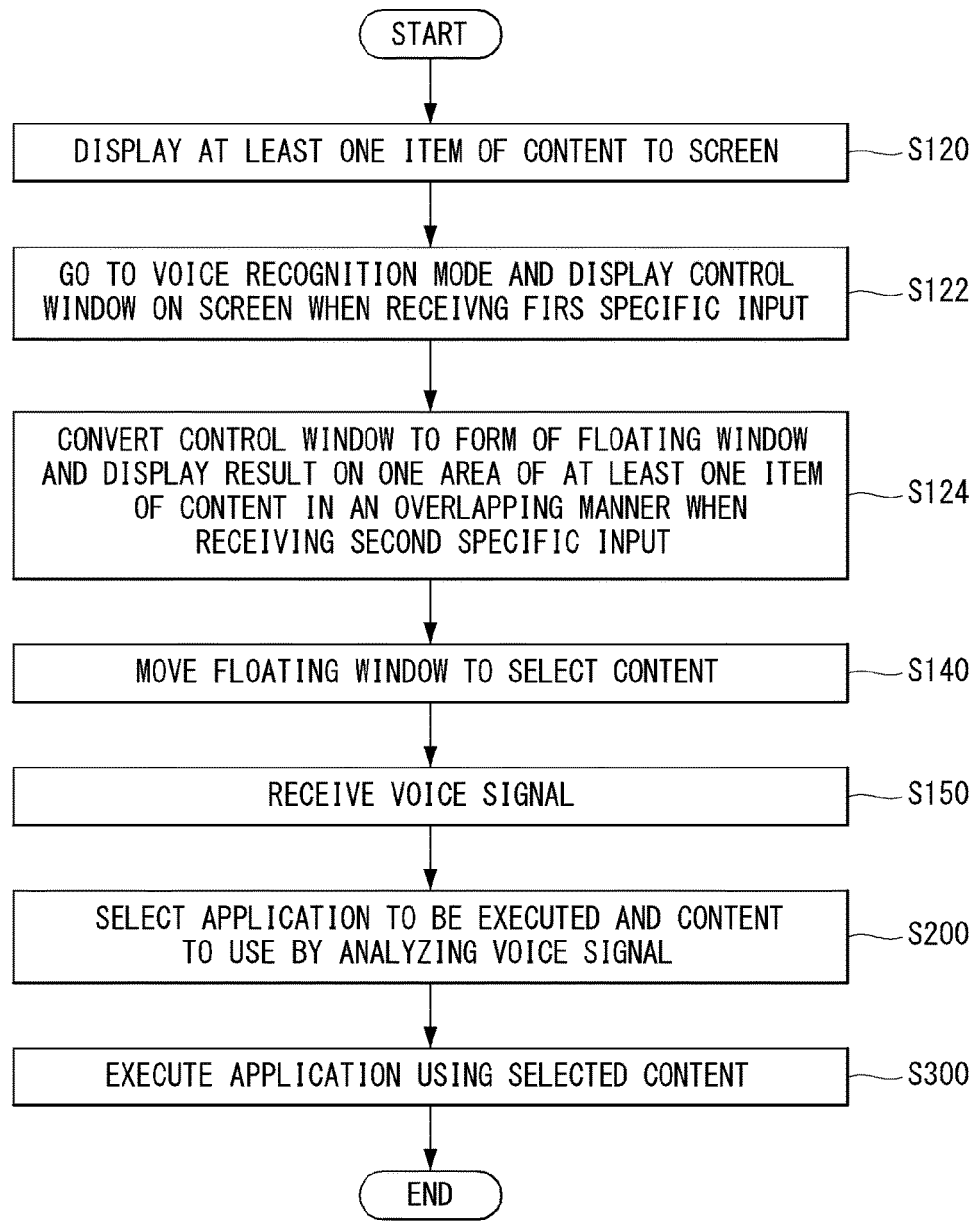
FIG. 9 is a flowchart illustrating a method of controlling a mobile terminal according to a second embodiment of the present invention.

FIG. 9 is a flowchart illustrating a method of controlling a mobile terminal according to a second embodiment of the present invention. FIGS. 10A to 14C are diagrams, each for describing the method of controlling the mobile terminal according to the second embodiment of the present invention.

Referring to FIG. 9, the method of controlling the mobile terminal according to the second embodiment of the present invention is an embodiment in which in a state where a specific application is executed, switching to a voice recognition mode is performed, and a fixed control window on which to control the voice recognition mode is converted to a floating window that is movable and transparent, and then content included in an execution screen of the specific application is selected as the floating window, that is, selected as the content to be used, and another application is newly executed by using the selected content.

According to the second embodiment, a controller (180 in FIG. 1) displays at least one item of content included in the execution screen of the specific application that is currently executed, on a touch screen (S120).

When receiving a first specific input, the controller (180 in FIG. 1) goes to the voice recognition mode, and displays a control window on a screen (S122).

The voice recognition mode is a mode in which a voice signal received from a microphone (122 in FIG. 1) is analyzed, and a result of the execution is provided by performing a specific function according to a meaning of the analyzed voice signal. The voice recognition mode is also a mode in which a text-based voice recognition application is executed. The control window represents a fixed window or a screen on which to control the voice recognition mode.

Specifically, when receiving the first specific input, the controller (180 in FIG. 1) goes to the voice recognition mode, and activates the microphone (122 in FIG. 1) to receive the voice signal through the microphone.

At this point, the first specific input is a touch input by which to select a shortcut icon on a status bar.

When the voice recognition application is executed, the controller (180 in FIG. 1) displays the control window on which to control the voice recognition mode, on one area of the touch screen. In a case where the control window is displayed on the one area of the screen, the controller (180 in FIG. 1) displays the control window on a high-order layer of the one area of a home screen, or displays the control window on one area of the home screen in the form of a pop-up window, or divide the touch screen area into a first area and a second area to display the home screen on the first area and display the control widow on the second screen.

Next, when receiving a second specific input, the controller (180 in FIG. 1) converts the control window to a form of a floating window and displays the floating window on one area of the screen in an overlapping manner (S124).

At this point, the second specific input is a touch input with respect to a soft key displayed on the control window, a touch input with respect to a function key on the mobile terminal (100 in FIG. 1), or an operational input with respect to an operational key installed on a lateral surface of the mobile terminal (100 in FIG. 1).

When receiving the second specific input, the controller (180 in FIG. 1) converts the control window to the form of the floating window that is movable and transparent, and displays the first specific input on one area of the touch screen that is present prior to the receiving of the first specific input, in an overlapping manner.

For example, in a case where the screen present prior to the receiving of the first specific input is the execution screen of the specific application, the controller (180 in FIG. 1) displays the floating window on one area of the execution screen of the specific application in an overlapping manner. Because the floating window is formed as transparent or translucent, the user visually distinguishes at least one item of content displayed on the one area of the execution screen of the specific application.

Therefore, the controller (180 in FIG. 1) may continue to execute the specific application in a state where the floating window is displayed.

In a case where the specific application is executed, the controller (180 in FIG. 1) displays the execution screen that is switched, and displays the floating window on the one area of the execution screen of the switched specific application in an overlapping manner.

Therefore, the execution screen of the specific application is visible to the user, through the transparent or translucent floating window.

The controller (180 in FIG. 1) selects at least one item of content of multiple items of content included in the execution screen of the currently-displayed specific application, by moving the floating window (S140).

The controller (180 in FIG. 1) selects the content by moving a position of the floating window to an area that overlaps with the content to be selected, or visually display the content to be selected and select the content by moving the position of the floating window to an area adjacent to the content to be selected. The controller (180 in FIG. 1) adjusts a size of an area including the content to be selected, by adjusting a size of the floating window.

The controller (180 in FIG. 1) receives the voice signal through the activated microphone (122 in FIG. 1) (S150). At this point, the voice signal represents the voice command in which another application stored in the mobile terminal (100 in FIG. 1) is executed by using all or some of the multiple items of content that are currently displayed on the touch screen, in order to perform a specific function.

The controller (180 in FIG. 1) converts the voice signal received through the microphone (122 in FIG. 1) to a text, selects the application to be executed and the content to be used, by analyzing the meaning of the text-converted voice signal (S200), and executes the application by using the selected content.

For example, when the voice signal means that "Upload this screen onto Cyworld," the controller (180 in FIG. 1) captures the execution screen of the currently-displayed specific application, and after executing a Cyworld application stored in the mobile terminal (100 in FIG. 1), it uploads a file of the captured photograph.

That is, the controller (180 in FIG. 1) selects the content to be used, from the currently-displayed screen, by analyzing the meaning of the received voice signal, and executes the application, by using the information on the content.

In a case where the selected content is a photograph or a captured screen, a thumbnail file of the photograph, or the captured screen is used as information on the content. In a case where the selected content is a news matter found using a Web browser, a URL address of a screen of the news matter or a link address to the screen of the news matter is used as the information on the content. The information on the content includes an audio file, a video file, a photograph file, a URL address, a telephone number, an email address and the like, depending on a type of the selected content, or on the application to be used.

The controller (180 in FIG. 1) performs functions of transmitting, sharing and uploading data, by using the information on the selected content.

Figure 10A:
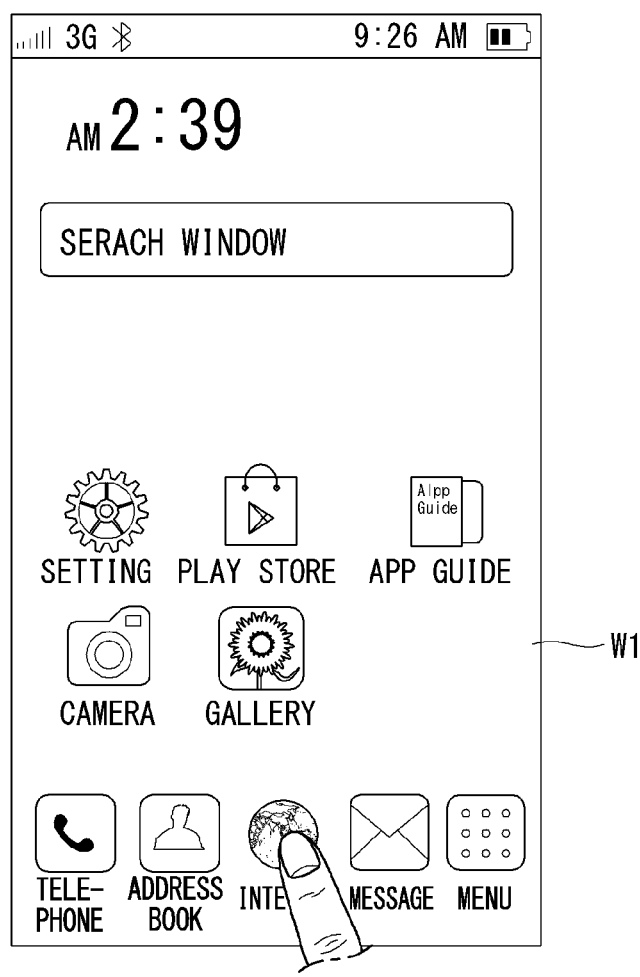
FIGS. 10A to 14C are diagrams, each for describing a method of controlling a mobile terminal according to a second embodiment of the present invention.
Figure 10B:
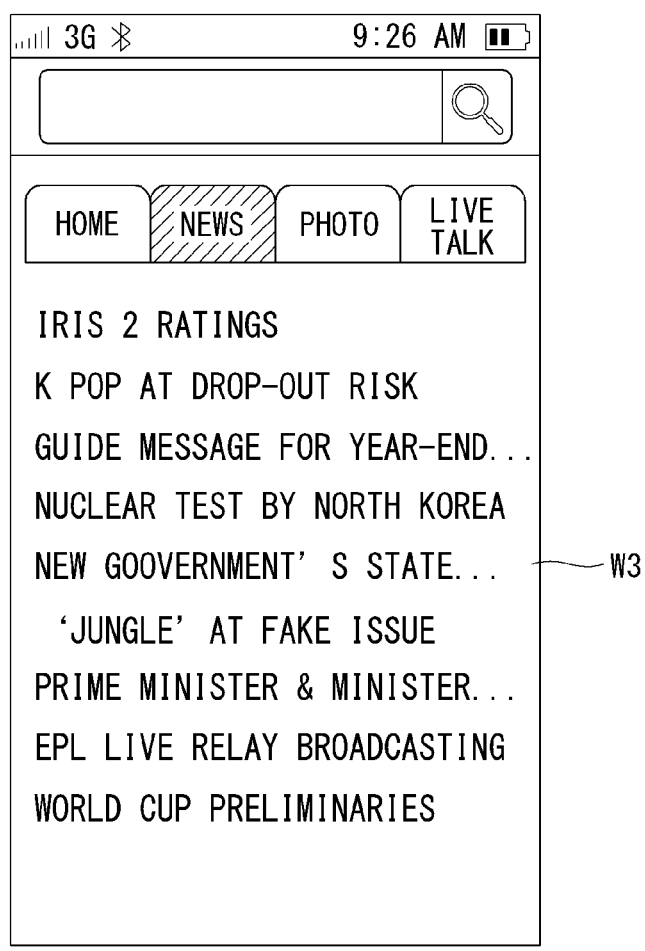

Referring to FIGS. 10A or 10B, the controller (180 in FIG. 1) executes the specific application by touching on an icon of the specific application displayed on a home screen W1 in order to display an execution screen W3 of the specific application on the touch screen.

For example, when the Web browser application displayed on the home screen W1 is executed (FIG. 10A), the controller (180 in FIG. 1) displays the content included in an execution screen W3 of the Web browser, on the touch screen (FIG. 10B). The content included in the execution screen W3 of the Web browser includes a news headline, a detailed news, a linked news, and the like.

Figure 11A:
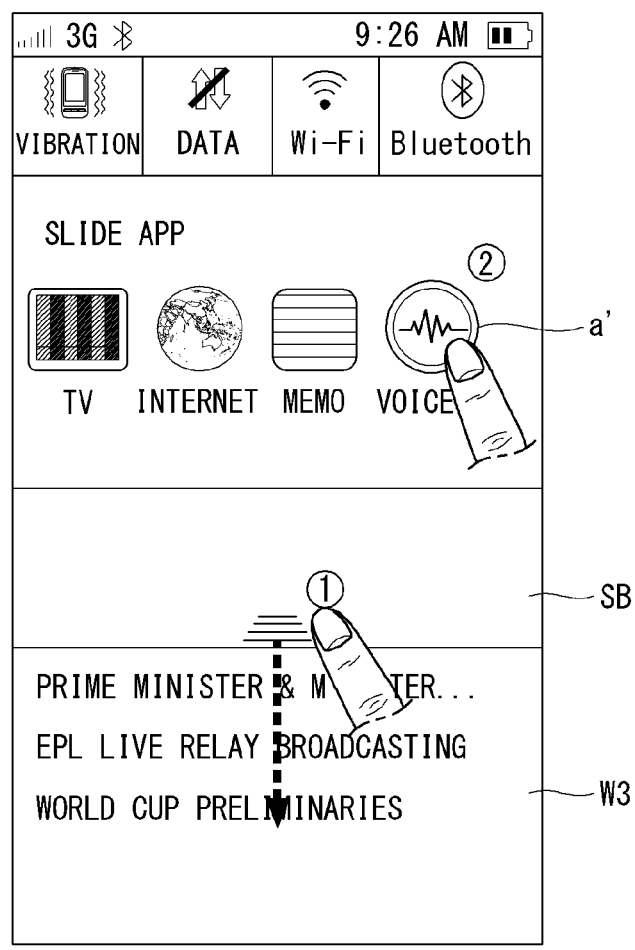
Figure 11B:
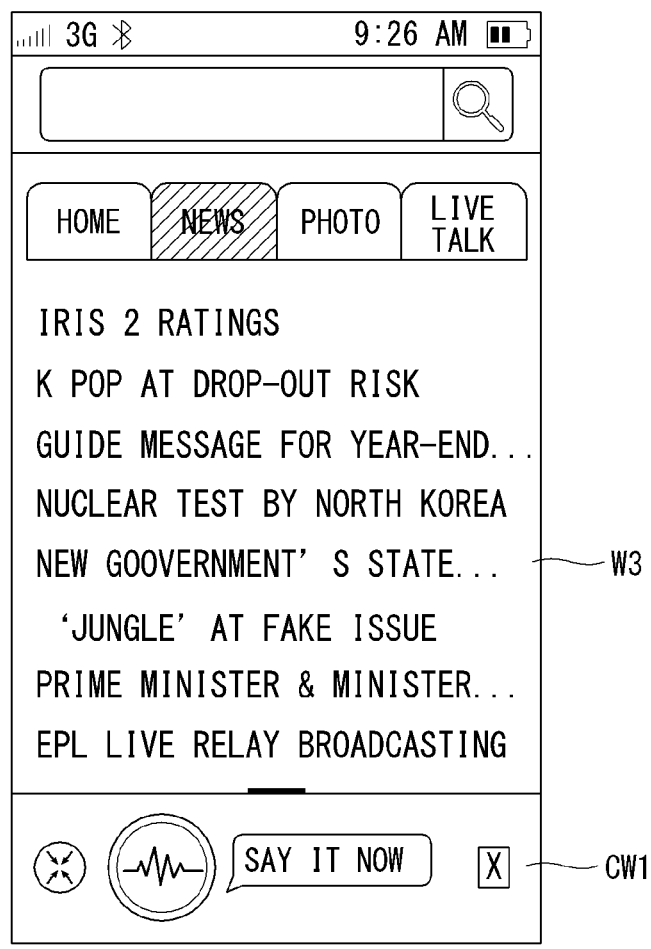

Referring to FIGS. 11A and 11B, when receiving a specific input, the controller (180 in FIG. 1) goes to the voice recognition mode to display a control window CW1.

Specifically, when a status bar SB is slid to the lower portion of a touch screen (①) and then the touch input with respect to a shortcut icon a' to a voice recognition application is received among slide applications on the status bar SB (②), the controller (180 in FIG. 1) executes the voice recognition application to go to the voice recognition mode (FIG. 11A).

The control window CW1, which is displayed on a lower area of the execution screen W3 of the specific application in an overlapping manner, is a fixed non-transparent window in the form of a pop-up window, and thus an area of the screen W3 that overlaps with the control window CW is invisible to the user (FIG. 11B).

Figure 12A:
Figure 12B:
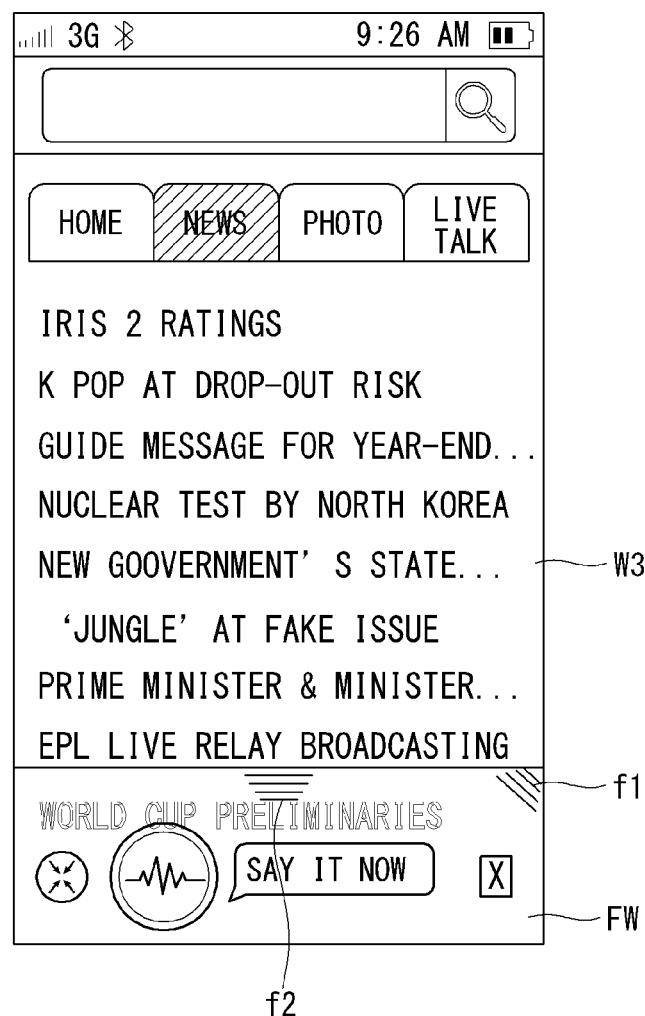

Referring to FIGS. 12A and 12B, when receiving the specific input with respect to the control window CW1, the controller (180 in FIG. 1) converts the control window CW1 to a floating window FW to display it.

At this point, the specific input is a touch input with respect to the soft key displayed on a specific area of the control window CW1 (FIG. 12A), or is a touch input by which to move an empty area of the control window CW1, in a touched state, from left to right.

When receiving the specific input, the controller (180 in FIG. 1) converts the control window CW1 to the form of the floating window FW that is movable and transparent, in order to display it (FIG. 12B). At this point, the floating window FW is displayed on an area where the control window CW1 is positioned, or on another area of the touch screen.

In a case where the converted floating window FW is displayed on the area where the control window CW1 is positioned, the controller (180 in FIG. 1) displays the floating window FW in such a manner that the conversion of the floating window FW to the movable floating window FW is visually recognized, by using a technique such as displaying the floating window FW to a smaller size than the control window CW1 or displaying the border in a twofold manner.

The floating window FW is formed as a transparent or translucent layer in such a manner that the content displayed on the execution screen W3 of the specific application on the overlapping row-order layer is visible.

In this case, the execution screen W3 of the specific application is visible to the user through the transparent floating window FW.

A first indicator f1, which is able to adjust the size, is displayed on a corner of the floating window FW, and a second indicator f2, which is able to hide the floating window FW from the touch screen, is displayed on a specific area of the floating window FW.

Therefore, while the specific application is executed, the controller (180 in FIG. 1) may continue to display the floating window FW on the touch screen, without the floating window FW burying the execution screen of the specific application.

Figure 13A:
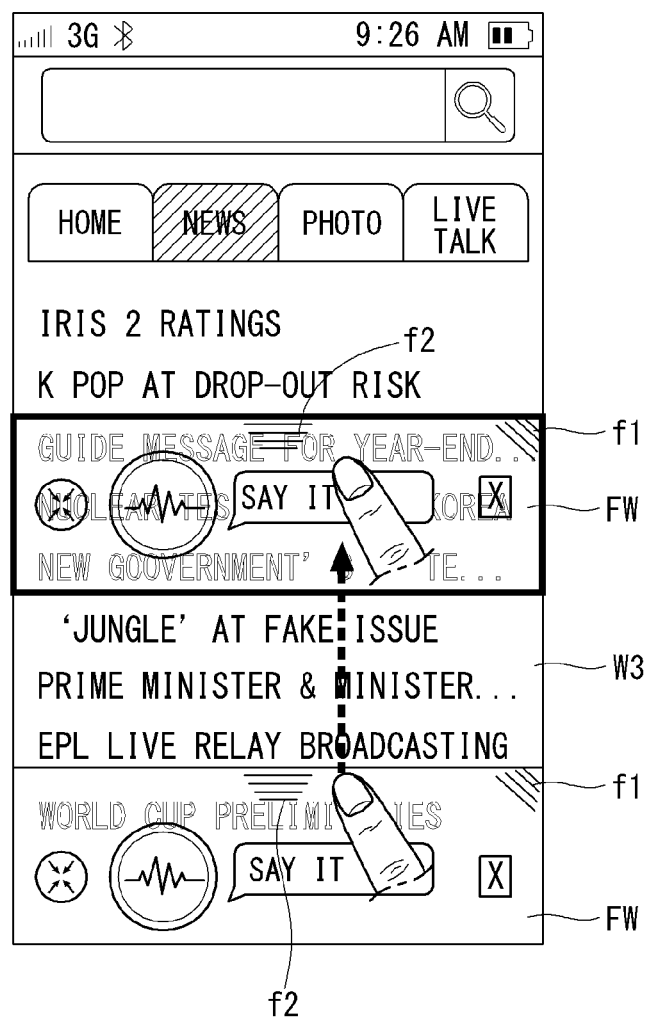
Figure 13B:
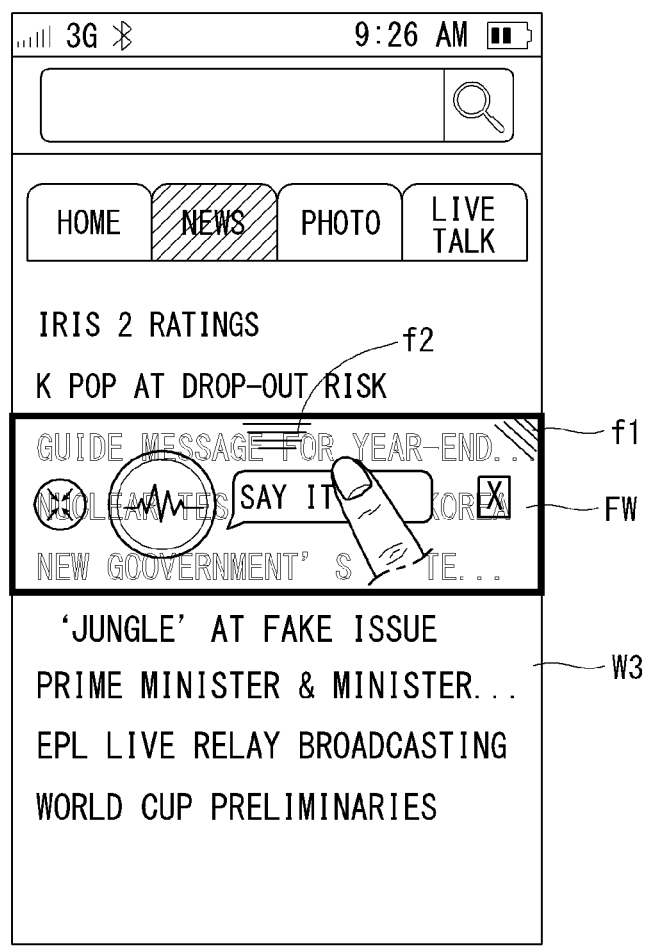
Figure 13C:
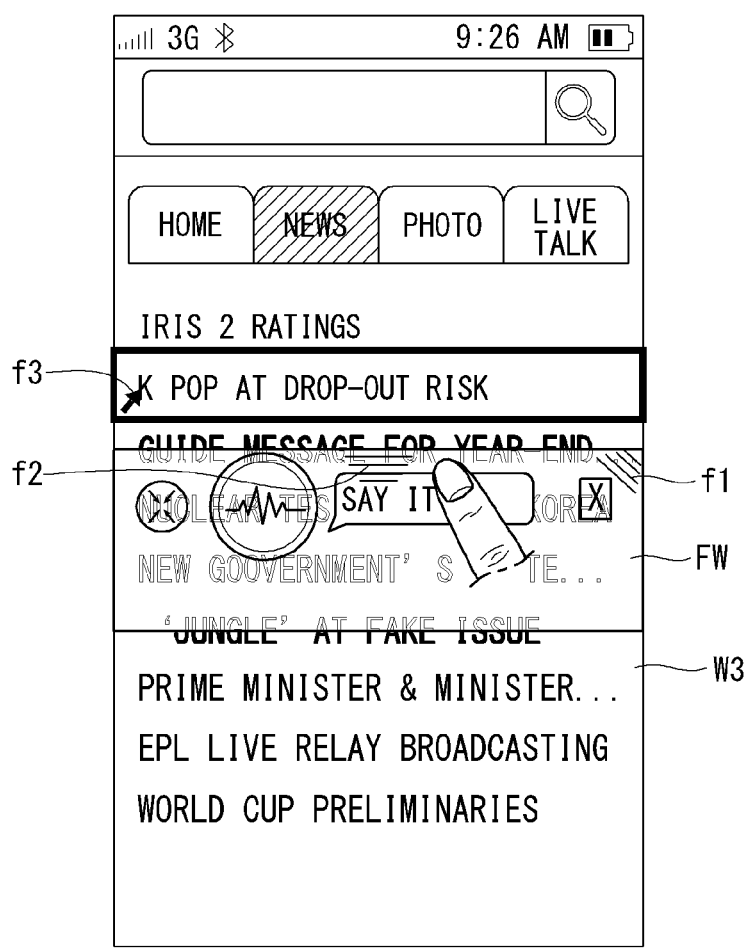

Referring to FIGS. 13A or 13C, when receiving a drag input with respect to the floating window FW, the controller (180 in FIG. 1) moves the floating window FW along a drag trajectory.

Specifically, when an empty area of the floating window FW is dragged in a touched state, the controller (180 in FIG. 1) moves the floating window FW to a specific area along a trajectory of the drag, and when the drag input is released, it positions the floating window FW to an area where the drag input is released (FIGS. 13A to 13B).

For example, in a case where the screen W3 on which the news headline is shown is displayed by executing the Web browser application, the controller (180 in FIG. 1) moves the floating window FW in such a manner that the specific news headline and the floating window FW overlap with each other (FIG. 13B).

When the floating window FW is moved, the controller (180 in FIG. 1) selects at least one item of content one area of which overlaps with the floating window FW, as a specific content to be used, or selects content positioned on an upper portion or a lower portion of the floating window FW, as the specific content to be used.

At this point, the controller (180 in FIG. 1) displays the selected area or the area included in the content, in such a manner that it is visually distinguishable.

For example, the controller (180 in FIG. 1) displays a border of the selected content or the area included in the content, in such a manner that it is highlighted, or displays the selected content or the area included in the content, in such a manner that it takes on a different color, or displays the selected content or the area included in the content, in such a manner that it is at a different level of brightness, compared to the other areas. In addition, in a case where the content adjacent to the floating window FW is selected, the control unit (180 in FIG. 1) displays the border of the selected content in such a manner that it is highlighted, and additionally displays a mark f3 connecting between the floating window FW and the selected content (FIG. 13C).

Figure 14A:
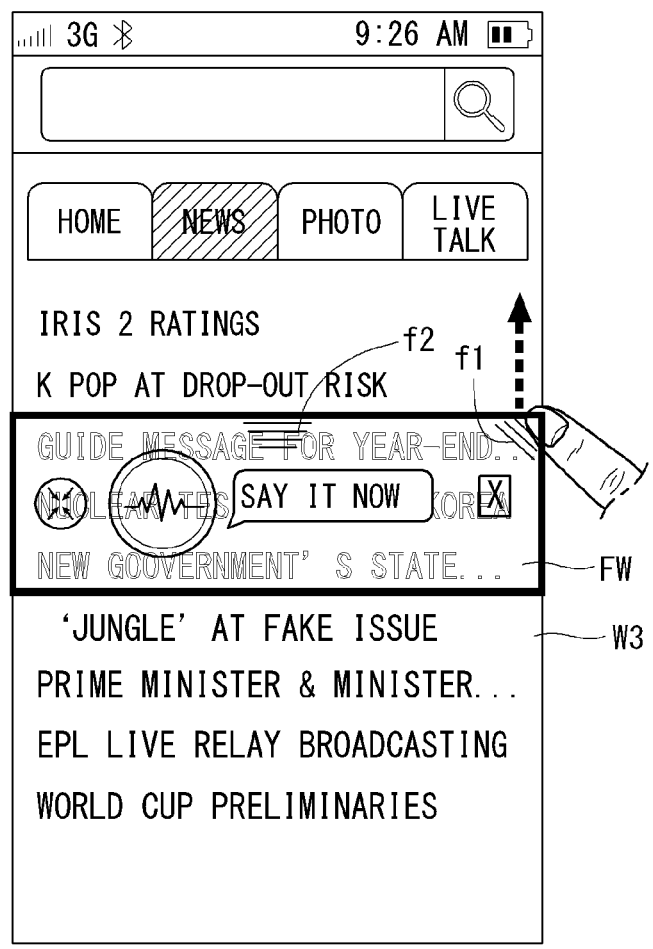
Figure 14B:
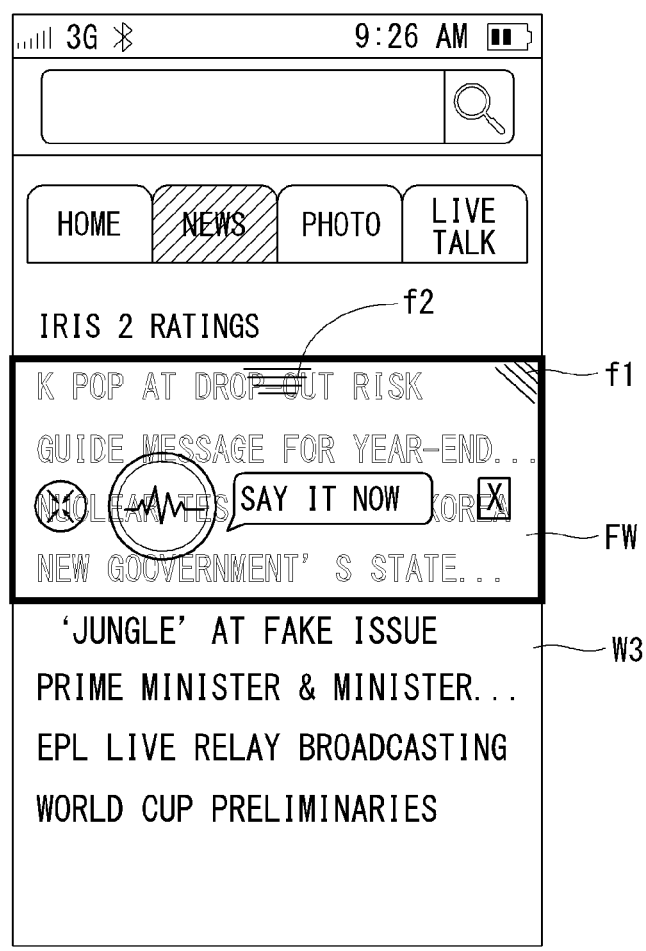
Figure 14C:
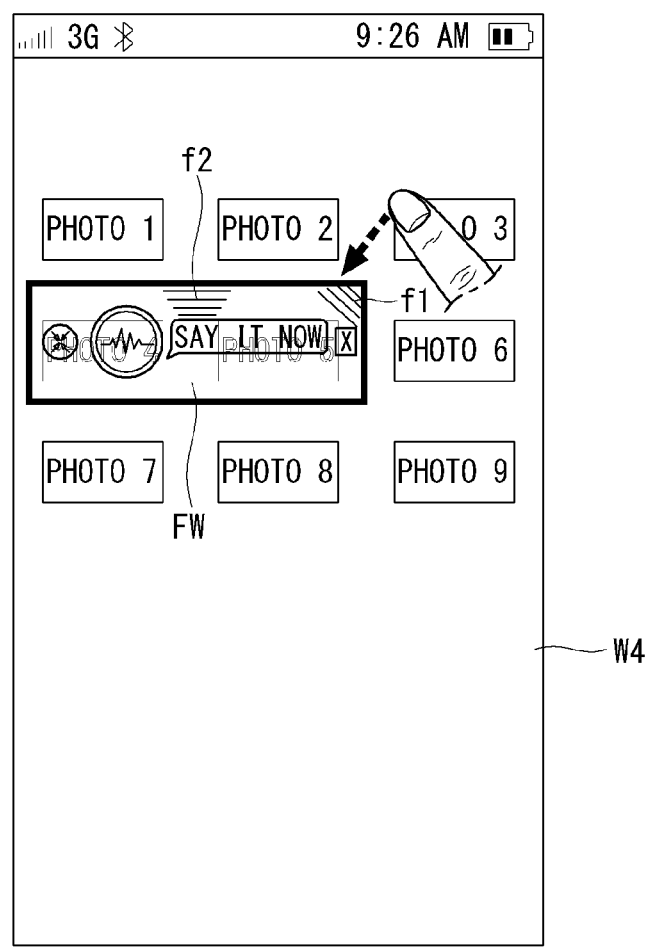

Referring to FIGS. 14A to 14C, the controller (180 in FIG. 1) adjusts a size of the floating window FW.

Specifically, the controller (180 in FIG. 1) drags the first indicator f1 displayed on the floating window FW to a specific point, in a touched state of the first indicator f1, to adjust the size of the floating window FW.

When receiving the input by which to drag the first indicator f1 displayed on the floating window FW to a specific point outside the floating window FW, the controller (180 in FIG. 1) enlarges the size of the floating window FW (FIG. 14B). When receiving the input by which to drag the first indicator f1 to a specific point inside the floating window FW, the controller (180 in FIG. 1) reduces the size of the floating window FW (FIG. 14C).

The controller (180 in FIG. 1) changes the content being selected, by enlarging or reducing the size of the floating window FW. When receiving the voice signal representing that the selected content is used in the voice recognition mode, the controller (180 in FIG. 1) selects the content selected by the floating window FW, as the content to be used.

Figure 15:
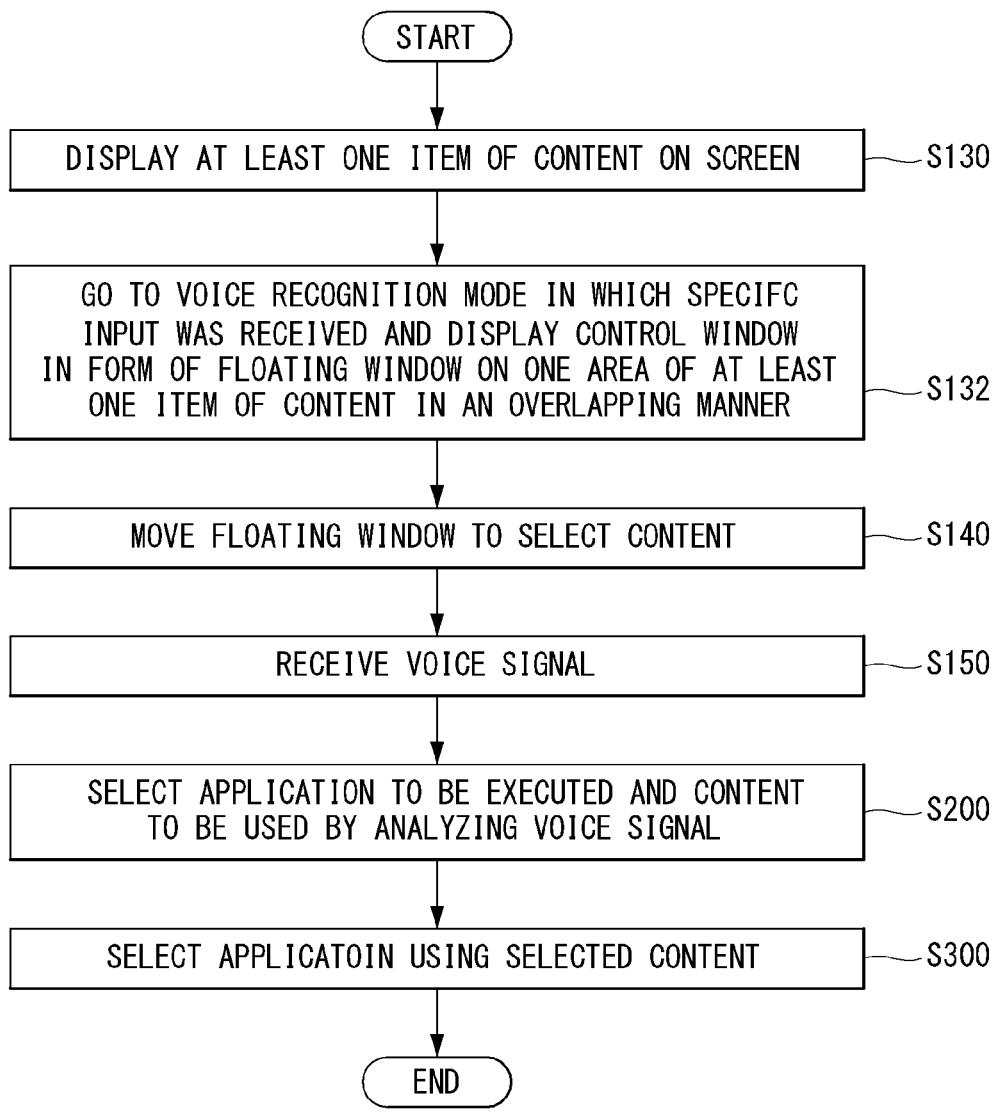
FIG. 15 is a flowchart illustrating a method of controlling a mobile terminal according to a third embodiment of the present invention.
Figure 16A:
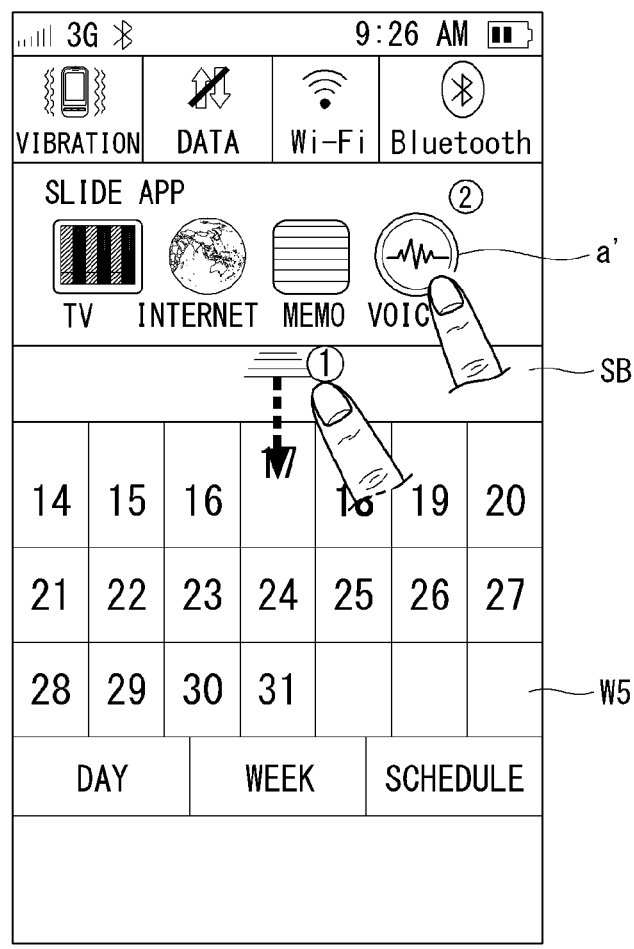
FIGS. 16A to 16B are diagrams, each for describing the method of controlling the mobile terminal according to the third embodiment of the present invention.
Figure 16B:
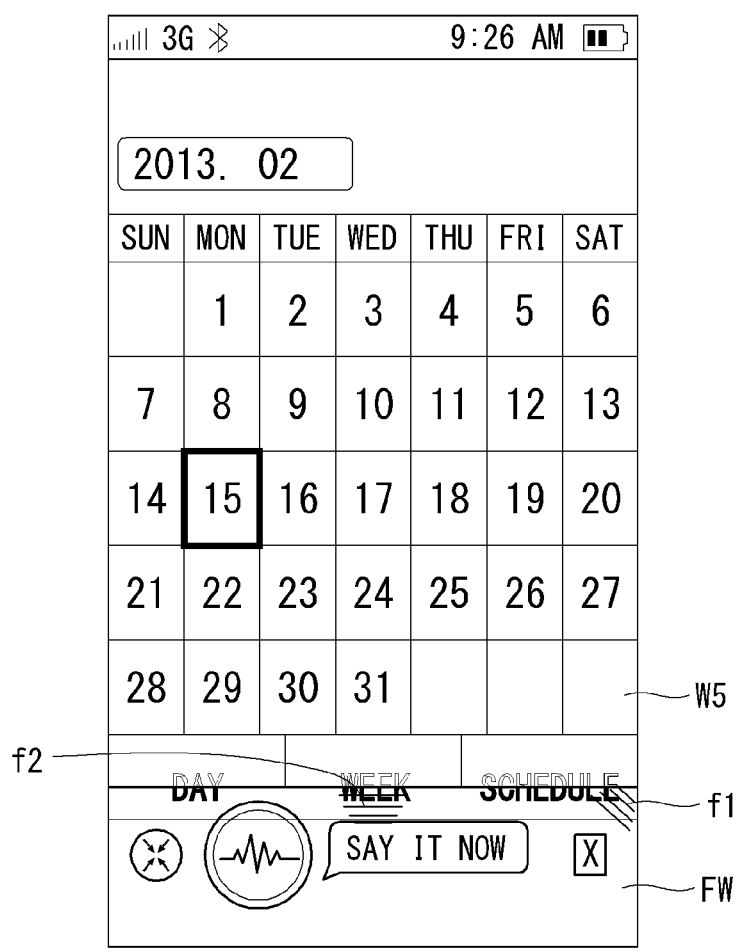

FIG. 15 is a flowchart illustrating a method of controlling a mobile terminal according to a third embodiment of the present invention. FIGS. 16A to 16B are diagrams, each for describing the method of controlling the mobile terminal according to the third embodiment of the present invention.

Referring to FIG. 15, the method of controlling the mobile terminal according to the third embodiment of the present invention is an embodiment in which in a state where a specific application is executed, switching to a voice recognition mode is performed, a fixed control window on which to control the voice recognition mode is displayed in the form of a floating window that is movable and transparent, content included in an execution screen of the specific application is selected as the floating window, that is, selected as the content to be used, and another application is newly executed by using the selected content.

According to the third embodiment, a controller (180 in FIG. 1) displays at least one item of content of the multiple items of content included in the execution screen of the specific application that is currently executed, on a touch screen (S130).

When receiving a first specific input, the controller (180 in FIG. 1) goes to the voice recognition mode, and displays a control window in the form of the floating window on a screen (S132).

According to the second embodiment, a process of converting a fixed control window to the form of the floating window is needed, but according to the third embodiment, the processing that converts the fixed control window to the form of the floating window is omitted.

The voice recognition mode is a mode in which a voice signal received from a microphone (122 in FIG. 1) is analyzed, and a result of the execution is provided by performing a specific function according to a meaning of the analyzed voice signal. The voice recognition mode is also a mode in which a text-based voice recognition application is executed. The control window represents a screen on which to control the voice recognition mode.

Specifically, when receiving the first specific input, the controller (180 in FIG. 1) goes to the voice recognition mode, and activates the microphone (122 in FIG. 1) to receive the voice signal through the microphone (122 in FIG. 1).

At this point, the first specific input is a touch input by which to select a shortcut icon on a status bar.

When a voice recognition application is executed, the controller (180 in FIG. 1) displays directly it in the form of the floating window that is movable and transparent, in such a manner that it overlaps with one area of an execution screen of a specific application.

That is, the execution screen of the specific application is visible to the user, through the transparent or translucent floating window.

The controller (180 in FIG. 1) selects at least one item of content of multiple items of content included in the execution screen of the currently-displayed specific application, by moving the floating window (S140).

The controller (180 in FIG. 1) selects the content by moving a position of the floating window to an area that overlaps with the content to be selected, or visually displays the content to be selected and selects the content by moving the position of the floating window to an area adjacent to the content to be selected. The controller (180 in FIG. 1) adjusts a size of an area including the content to be selected, by adjusting a size of the floating window.

The controller (180 in FIG. 1) receives the voice signal through the activated microphone (122 in FIG. 1) (S150). At this point, the voice signal represents a voice command in which another application stored in the mobile terminal (100 in FIG. 1) is executed by using all or some of the multiple items of content currently displayed on the touch screen, in order to perform a specific function.

The controller (180 in FIG. 1) converts the voice signal received through the microphone (122 in FIG. 1) to a text, selects the application to be executed and the content to be used by analyzing the meaning of the text-converted voice signal (S200), and executes the application by using the selected content.

For example, when the voice signal means that "Upload this screen onto Kakao Story," the controller (180 in FIG. 1) captures the execution screen of the currently-displayed specific application, and after uploading a Kakao Story application stored in the mobile terminal (100 in FIG. 1), it uploads a file of the captured photograph.

That is, the controller (180 in FIG. 1) selects the content to be used, from the currently-displayed screen, by analyzing the meaning of the received voice signal, and executes the application, by using the information on the content.

In a case where the selected specific content is the photograph or the captured screen, a thumbnail file of the photograph, or the captured screen is used as information on the content. In a case where the selected specific content is a news matter found using a Web browser, a URL address of a screen of the news matter or a link address to the screen of the news matter is used as the information on the content. The information on the content includes an audio file, a video file, a photograph file, a URL address, a telephone number, an email address and the like, depending on a type of the selected content, or on the application to be used.

The controller (180 in FIG. 1) performs functions of transmitting, sharing and uploading data, by using the information on the selected content.

The third embodiment is different in configuration from the second embodiment in that the floating window is directly displayed in such a manner that it overlaps with the specific application, without displaying the control window in the voice recognition mode, and therefore this difference is specifically described below.

Referring to FIGS. 16A and 16B, when a status bar SB is slid to the lower portion of a touch screen in a state where the execution screen W5 of the specific application is executed (①) and then the touch input with respect to a shortcut icon a' to a voice recognition application is received among slide applications on the status bar SB ((②)), the controller (180 in FIG. 1) executes the voice recognition application to go to the voice recognition mode (FIG. 16A).

The floating window FW, transparent and movable, is displayed on the lower area of the execution screen W5 of the specific application in an overlapping manner.

Therefore, the area of the screen W5 overlapping with the floating window FW is visually recognizable to the user, and the floating window FW does not bury the execution screen W5 of the specific application. As a result, the specific application may continue to be executed.

When in the voice recognition mode, execution of the selected application that is transmitted or shared is completed by executing the selected content, as the selected application, the controller (180 in FIG. 1) according to the present invention displays back the screen in which the control window (or the floating window) on which to control the voice recognition mode overlaps, on the execution screen of the specific application.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
    a touch screen;
    an audio input unit; and
    a controller configured to:
    display a first execution screen of a first application on the touch screen, wherein the first execution screen includes a plurality of content items;
    display a control window in response to entering a voice recognition mode, wherein the control window includes a notification indicating the voice recognition mode and a soft key for converting the control window to a moveable floating window;
    convert the control window to the movable floating window and display the movable floating window which overlaps with a first area of the first execution screen, in response to a specific input on the soft key, wherein the movable floating window includes a first indicator for adjusting a size of the movable floating window and a second indicator for hiding the movable floating window from the touch screen;
    move the movable floating window to an area in which at least one content item among the plurality of content items is displayed and adjust the size of the moveable floating window to correspond to the area in response to a dragging input on the first indicator, wherein the at least one content item is displayed on the touch screen before receiving the voice signal;
    receive a voice signal through the audio input unit, in the voice recognition mode;
    select a second application to be executed based on the voice signal and the at least one content item;
    execute the selected second application to perform a function of using the at least one content item based on the voice signal; and
    display a second execution screen of the selected second application in a form of a pop-up window on a second area of the first execution screen.

2. The mobile terminal according to claim 1, wherein the controller is further configured to:
    move the movable floating window along a trajectory of a drag input, in response to receiving the drag input with respect to the moveable floating window;
    display the at least one content item in a visually distinctive manner that distinguishes the at least one content item from other content items among the plurality of content items, in response to at least one area of the at least one content item overlapping with the moved moveable floating window; and
    determine the at least one content item overlapping with the moved moveable floating widow as the selected at least one content item, in response to a release of the drag input.

3. The mobile terminal according to claim 1, wherein the controller is further configured to:
    reduce or enlarge a size of the moveable floating window, in response to receiving a specific input on the moveable floating window;
    display the at least one content item in a visually distinctive manner that distinguishes the at least one content item from other content items among the plurality of content items, in response to at least one area of the at least one content item overlapping with the reduced or enlarged moveable floating window; and
    determine the at least one content item overlapping with the reduced or enlarged moveable floating widow as the selected at least one content item.

4. The mobile terminal according to claim 1, wherein the controller is further configured to display the second indicator indicating the moveable floating window is hidden, in response to receiving a dragging input of dragging the moveable floating window to a border area of the touch screen.

5. The mobile terminal according to claim 1, wherein if the at least one content item is a photograph, the controller sets a thumbnail file of the photograph, as the selected at least one content item, and
    wherein if the at least one content item is displayed within a screen of a Web browser, the controller sets a URL address of the screen of the Web browser or a link address to the screen of the Web browser as the selected at least one content item.

6. The mobile terminal according to claim 1, wherein the controller is further configured to go back to the voice recognition mode, when execution of the application is completed or the execution is canceled.

7. The mobile terminal according to claim 1, wherein the controller is further configured to display the control window on an upper or lower area of an execution screen of the first application, in response to entering the voice recognition mode based on sliding a status bar down from an upper portion of the touch screen and selecting a shortcut icon displayed on the status bar, and
    wherein the status bar including the short cut icon and the execution screen of the first application are displayed together on the touch screen.

8. The mobile terminal according to claim 1, wherein the controller is further configured to:
    divide the touch screen into a first area and a second area, in response to entering the voice recognition mode; and
    display the at least one content item on the first area of the touch screen and the control window on the second area of the touch screen.

9. A method of controlling a mobile terminal, the method comprising:
    displaying a first execution screen of a first application on a touch screen, wherein the first execution screen includes a plurality of content items;
    displaying a control window in response to entering a voice recognition mode, wherein the control window includes a notification indicating the voice recognition mode and a soft key for converting the control window to a movable floating window;
    converting the control window to the movable floating window and displaying the moveable floating window which overlaps a first area of the first execution screen, in response to a specific input on the soft key, wherein the movable floating window includes a first indicator for adjusting a size of the movable floating window and a second indicator for hiding the movable floating window from the touch screen;
    moving the movable floating window to an area in which at least one content item among the plurality of content items is displayed and adjusting the size of the moveable floating window to correspond to the area in response to a dragging input on the first indicator, wherein the at least one content item is displayed on the touch screen before receiving the voice signal;
    receive a voice signal while the plurality of content items are displayed;
    selecting a second application to be executed based on the voice signal and the at least one content item;

executing the selected second application to perform a function of using the at least one content item based on the voice signal; and displaying a second execution screen of the selected second application in a form of a pop-up window on a second area of the first execution screen.

10. The mobile terminal according to claim 1, wherein the movable floating window is a transparent window overlapping an execution screen of the first application and the execution screen of the first application is visible through the movable floating window.

11. The method of controlling a mobile terminal according to claim 9, wherein the movable floating window is a transparent window overlapping an execution screen of the first application and the execution screen of the first application is visible through the movable floating window.

* * * * *